(12) United States Patent
Sancoff et al.

(10) Patent No.: US 8,408,155 B2
(45) Date of Patent: Apr. 2, 2013

(54) FLEET PROTECTION ATTACK CRAFT

(75) Inventors: Gregory E. Sancoff, North Hampton, NH (US); Joseph A. DiCarlo, Chester, NH (US)

(73) Assignee: Juliet Marine Systems, Inc., Portsmouth, NH (US)

( * ) Notice: Subject to any disclaimer, the term of this patent is extended or adjusted under 35 U.S.C. 154(b) by 462 days.

(21) Appl. No.: 12/485,848

(22) Filed: Jun. 16, 2009

(65) Prior Publication Data

US 2011/0226173 A1    Sep. 22, 2011

Related U.S. Application Data

(60) Provisional application No. 61/132,184, filed on Jun. 16, 2008, provisional application No. 61/200,284, filed on Nov. 26, 2008.

(51) Int. Cl.
*B63B 1/30* (2006.01)

(52) U.S. Cl. ..... 114/282; 114/283; 114/285; 114/61.14; 114/152; 114/39.24; 114/274; 114/280

(58) Field of Classification Search .......... 114/282, 114/283, 285, 61.14, 152, 39.24, 274, 280
See application file for complete search history.

(56) References Cited

U.S. PATENT DOCUMENTS

| | | | |
|---|---|---|---|
| 2,823,636 A | 2/1958 | Gongwer et al. | |
| 3,016,865 A | 1/1962 | Eichenberger | |
| 3,106,179 A | 10/1963 | Traksel et al. | |
| 3,343,513 A * | 9/1967 | Bader | 114/282 |
| 3,683,622 A | 8/1972 | Von Krusenstierna | |
| 3,730,123 A | 5/1973 | Lang | |
| 3,779,199 A | 12/1973 | Mayer, Jr. | |
| 3,830,178 A * | 8/1974 | Lang | 114/61.14 |
| 3,987,742 A | 10/1976 | Boisrayon et al. | |
| 4,186,679 A | 2/1980 | Fabula et al. | |
| 4,346,662 A | 8/1982 | Rogers | |
| 4,680,017 A | 7/1987 | Eller | |
| 4,681,508 A | 7/1987 | Kim | |
| 4,819,576 A | 4/1989 | Shaw | |
| 4,831,297 A | 5/1989 | Taylor et al. | |
| 4,902,254 A | 2/1990 | Chas | |
| 4,962,718 A | 10/1990 | Gornstein et al. | |
| 4,981,099 A | 1/1991 | Holder | |
| 5,191,848 A | 3/1993 | Hatfield | |
| 5,237,947 A | 8/1993 | Manning | |
| 5,252,875 A | 10/1993 | Veronesi et al. | |
| 5,277,142 A | 1/1994 | Connor | |
| 5,301,624 A * | 4/1994 | Hall et al. | 114/61.12 |
| 5,355,827 A | 10/1994 | Barbazash et al. | |
| 5,359,958 A | 11/1994 | Guild | |
| 5,383,801 A | 1/1995 | Chas | |
| 5,503,100 A | 4/1996 | Shaw | |
| 5,551,369 A | 9/1996 | Shen | |
| 5,601,047 A | 2/1997 | Shen | |
| 5,632,658 A * | 5/1997 | Chen et al. | 440/49 |

(Continued)

FOREIGN PATENT DOCUMENTS

DE    3614291    10/1987
WO    WO 98/08732    3/1998

*Primary Examiner* — J. Wooddrow Eldred

(74) *Attorney, Agent, or Firm* — Pandiscio & Pandiscio

(57) ABSTRACT

A marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second engines enclosed within the first and second buoyant tubular foils, respectively, and first and second propulsion units connected to the first and second engines, respectively, for moving the marine vessel through the water.

14 Claims, 37 Drawing Sheets

U.S. PATENT DOCUMENTS

| | | |
|---|---|---|
| 5,634,419 A | 6/1997 | Cymara |
| 5,645,008 A | 7/1997 | Loui |
| 5,794,558 A | 8/1998 | Loui |
| 5,813,358 A | 9/1998 | Roccotelli |
| 5,941,189 A | 8/1999 | Johansson |
| 6,058,872 A | 5/2000 | Latorre |
| 6,095,076 A | 8/2000 | Nesbitt |
| 6,427,618 B1 | 8/2002 | Hilleman |
| 6,470,817 B2 * | 10/2002 | Delfosse .................... 114/61.14 |
| 6,591,776 B2 * | 7/2003 | Miyazaki ...................... 114/274 |
| 6,701,862 B2 | 3/2004 | Hilleman |
| 6,725,797 B2 | 4/2004 | Hilleman |
| 6,905,093 B2 * | 6/2005 | Dryer et al. ................. 244/3.28 |
| 7,219,613 B2 | 5/2007 | Root, Jr. |
| 7,278,364 B2 | 10/2007 | Root, Jr. |
| 2002/0152947 A1 | 10/2002 | Hilleman |
| 2003/0154896 A1 | 8/2003 | Schmidt |
| 2004/0200399 A1 | 10/2004 | Abdel-Maksoud et al. |
| 2006/0075948 A1 | 4/2006 | Root, Jr. |
| 2006/0075949 A1 | 4/2006 | Root, Jr. |
| 2008/0132130 A1 | 6/2008 | Nigel |
| 2009/0007831 A1 * | 1/2009 | Jouffroy ....................... 114/123 |

* cited by examiner

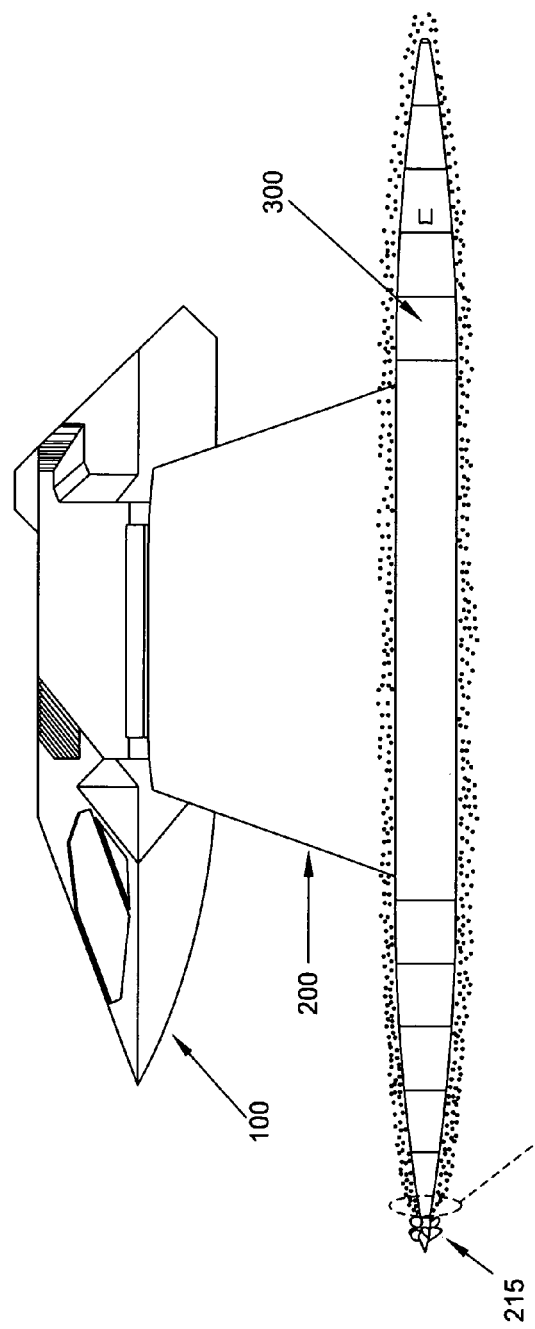
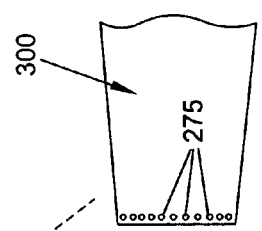
FIG. 15A
FIG. 15B

FLEET PROTECTION ATTACK CRAFT

REFERENCE TO PENDING PRIOR PATENT APPLICATIONS

This patent application claims benefit of:

(i) prior U.S. Patent Application Ser. No. 61/132,184, filed Jun. 16, 2008 by Gregory Sancoff for FORCE PROTECTION ATTACK CRAFT; and (ii) prior U.S. Patent Application Ser. No. 61/200,284, filed Nov. 26, 2008 by Gregory Sancoff et al. for FLEET PROTECTION ATTACK CRAFT (F-PAC).

The two above-identified patent applications are hereby incorporated herein by reference.

FIELD OF THE INVENTION

This invention relates to marine vessels in general, and more particularly to high-speed attack and reconnaissance craft.

BACKGROUND OF THE INVENTION

The terrorist attack on the guided missile destroyer USS Cole in Aden harbor in 2000 provided a devastating example of what a small group of terrorists can do to a modern warship with minimal resources—in the case of the USS Cole, two terrorists in a small boat carrying a few hundred pounds of explosives came close to sinking a billion dollar warship.

The success of the attack on the Cole has given rise to another, even more disturbing concern—that a large number of high speed boats, each packed with explosives and manned by suicide bombers, could create a "small boat swarm" which could overwhelm the defenses of a warship, particularly in restricted waters where reaction time and maneuverability may be limited. Indeed, recent wargame simulations suggest that such swarm tactics could prove extremely effective against naval battle groups operating in the narrow waters of the Persian Gulf.

It is currently believed that such "small boat swarm" tactics are best countered with fast, similarly-sized, highly-maneuverable and heavily-armed attack craft which can establish a defensive perimeter at a safe distance from the naval battle group. To this end, appropriately-outfitted Zodiac-type craft have already been deployed for this purpose. However, experience has shown that these Zodiac-type craft are only practical in the relatively calm waters of a harbor. This is because operating these Zodiac-type craft at high speed in the turbulent waters of the open sea imposes excessive physical stresses on the crews that can only be withstood for short periods of time. Furthermore, the defensive perimeter should, ideally, be established at a substantial distance from the battle group (e.g., at least 10 miles out), in order to give the battle group sufficient time to react in the event that any of the small boat swarm should penetrate the defensive perimeter established by the Zodiac-type craft. However, due to their light construction, limited operating time at high speeds, and limited fuel-carrying capacity, Zodiac-type craft are not capable of maintaining a reliable defensive perimeter so far out from the battle group. In practice, with Zodiac-type craft, the defensive perimeter must generally be maintained much closer to the battle group, with the consequent loss of reaction time.

It has been suggested that attack helicopters might be used to protect a naval battle group when it is at sea or at anchor. However, these attack helicopters generally have relatively limited range and, perhaps more importantly, relatively limited sortie time, which effectively prevents them from maintaining a reliable defensive perimeter a substantial distance out from the battle group. Furthermore, these attack helicopters generally have substantial radar, infrared and visual "signatures", thereby making them relatively easy to detect and target.

Thus, there is a need for a new and improved fleet protection attack craft which can be used to maintain a defensive perimeter a safe distance out from a naval battle group. In this respect it should be appreciated that such a craft should be small, fast, highly-maneuverable and heavily-armed. Furthermore, the craft should provide a stable platform even when running at high speed in substantial ocean swells, whereby to minimize physical stress on the crew and to provide a stable weapons platform. And the craft should be capable of remaining on station for a substantial period of time, in order to maintain a reliable defensive perimeter at a safe distance from the battle group.

There is also a need for a new and improved craft which can be used for reconnaissance, and/or to deliver small teams of special forces behind enemy lines and/or to extract the same. Thus, the craft should also be capable of "stealth mode" operation, i.e., it should have small radar, infrared, visual and noise signatures, thereby making it difficult to detect and target.

SUMMARY OF THE INVENTION

These and other objects of the present invention are addressed by the provision and use of a novel fleet protection attack craft. The novel attack craft is small, fast, highly-maneuverable and heavily-armed. The novel attack craft provides a stable platform even when running at high speed in substantial ocean swells, whereby to minimize physical stress on the crew and to provide a stable weapons platform. And the novel attack craft is capable of remaining on station for a substantial period of time, in order to maintain a reliable defensive perimeter at a safe distance from a naval battle group. Thus, the novel attack craft provides an effective means for defending against a "small boat swarm", by establishing a defensive perimeter at a safe distance from the battle group and thereby permitting the interception, identification, warning and, if ultimately necessary, destruction of hostile boats long before they can approach the battle group.

In addition, the novel attack craft is also capable of "stealth mode" operation, i.e., it has small radar, infrared, visual and noise signatures, thereby making it difficult to detect and target. Thus, the novel attack craft also provides an effective means for conducting reconnaissance and/or for delivering small teams of special forces behind enemy lines and/or for extracting the same.

In one form of the present invention, there is provided a marine vessel comprising:

a command module;

first and second buoyant tubular foils; and first and second struts for connecting the first and second buoyant tubular foils to the command module, respectively;

wherein the first and second buoyant tubular foils provide substantially all of the buoyancy required for the marine vessel;

wherein the first and second struts are pivotally connected to the command module and fixedly connected to the first and second buoyant tubular foils, respectively; and wherein the first and second struts comprise substantially rigid planar structures.

In another form of the present invention, there is provided a marine vessel comprising:

a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second engines enclosed within the first and second buoyant tubular foils, respectively, and first and second propulsion units connected to the first and second engines, respectively, for moving the marine vessel through the water.

In another form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second propeller mechanisms mounted on the leading ends of the first and second buoyant tubular foils, respectively, for moving the marine vessel through the water.

In another form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises a plurality of spoilers mounted on the first and second buoyant tubular foils for steering the marine vessel as it moves through the water.

In another form of the present invention, there is provided a marine vessel comprising:
a buoyant tubular foil; and
a propeller mechanism mounted on the leading end of the buoyant tubular foil for moving the marine vessel through the water.

In another form of the present invention, there is provided a marine vessel comprising:
a buoyant tubular foil; and
a plurality of spoilers mounted on the buoyant tubular foil for steering the marine vessel as it moves through the water.

In another form of the present invention, there is provided a marine vessel comprising:
a buoyant tubular foil;
a propeller mechanism mounted on the leading end of the buoyant tubular foil for moving the marine vessel through the water; and
a plurality of spoilers mounted on the buoyant tubular foil for steering the marine vessel through the water;
wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted.

In another form of the present invention, there is provided a method for moving through water, the method comprising:
providing a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel;
wherein the first and second struts are pivotally connected to the command module and fixedly connected to the first and second buoyant tubular foils, respectively; and
wherein the first and second struts comprise substantially rigid planar structures; and
moving the marine vessel through water and adjusting the position of the first and second struts relative to the command module.

In another form of the present invention, there is provided a method for moving through water, the method comprising:
providing a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second engines enclosed within the first and second buoyant tubular foils, respectively, and first and second propulsion units connected to the first and second engines, respectively, for moving the marine vessel through the water; and
moving the marine vessel through water.

In another form of the present invention, there is provided a method for moving through water, the method comprising:
providing a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second propeller mechanisms mounted on the leading ends of the first and second buoyant tubular foils, respectively, for moving the marine vessel through the water; and
moving the marine vessel through water.

In another form of the present invention, there is provided a method for moving through water, the method comprising:
providing a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises a plurality of spoilers mounted on the first and second buoyant tubular foils for steering the marine vessel as it moves through the water; and
moving the marine vessel through water and adjusting the position of the spoilers.

In another form of the present invention, there is provided a method for moving through water, the method comprising:
providing a marine vessel comprising:
a buoyant tubular foil; and
a propeller mechanism mounted on the leading end of the buoyant tubular foil for moving the marine vessel through the water; and
moving the marine vessel through water.

In another form of the present invention, there is provided a method for moving through water, the method comprising:
providing a marine vessel comprising:
a buoyant tubular foil; and
a plurality of spoilers mounted on the buoyant tubular foil for steering the marine vessel as it moves through the water; and
moving the marine vessel through water and adjusting the position of the spoilers.

In another form of the present invention, there is provided a method for moving through water, the method comprising:
providing a marine vessel comprising:
a buoyant tubular foil;
a propeller mechanism mounted on the leading end of the buoyant tubular foil for moving the marine vessel through the water; and
a plurality of spoilers mounted on the buoyant tubular foil for steering the marine vessel through the water;
wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted; and
moving the marine vessel through water and adjusting the position of the spoilers.

BRIEF DESCRIPTION OF THE DRAWINGS

These and other objects and features of the present invention will be more fully disclosed or rendered obvious'by the following detailed description of the preferred embodiments of the invention, which is to be considered together with the accompanying drawings wherein like numbers refer to like parts and further wherein:

FIGS. 15A and 15B are schematic views showing how a gaseous envelope may be provided around the BTFs so as to reduce drag as the vessel moves through the water;

DETAILED DESCRIPTION OF THE INVENTION

Overview

Looking first at FIGS. 1-6, there is shown a novel fleet protection attack craft 5. Attack craft 5 generally comprises a command module 100 for carrying the crew, weapons and payload (including passengers), a pair of buoyant tubular foils (BTFs) 200 for providing buoyancy, propulsion and steering, and a pair of struts 300 for supporting command module 100 on BTFs 200.

Figure 1:
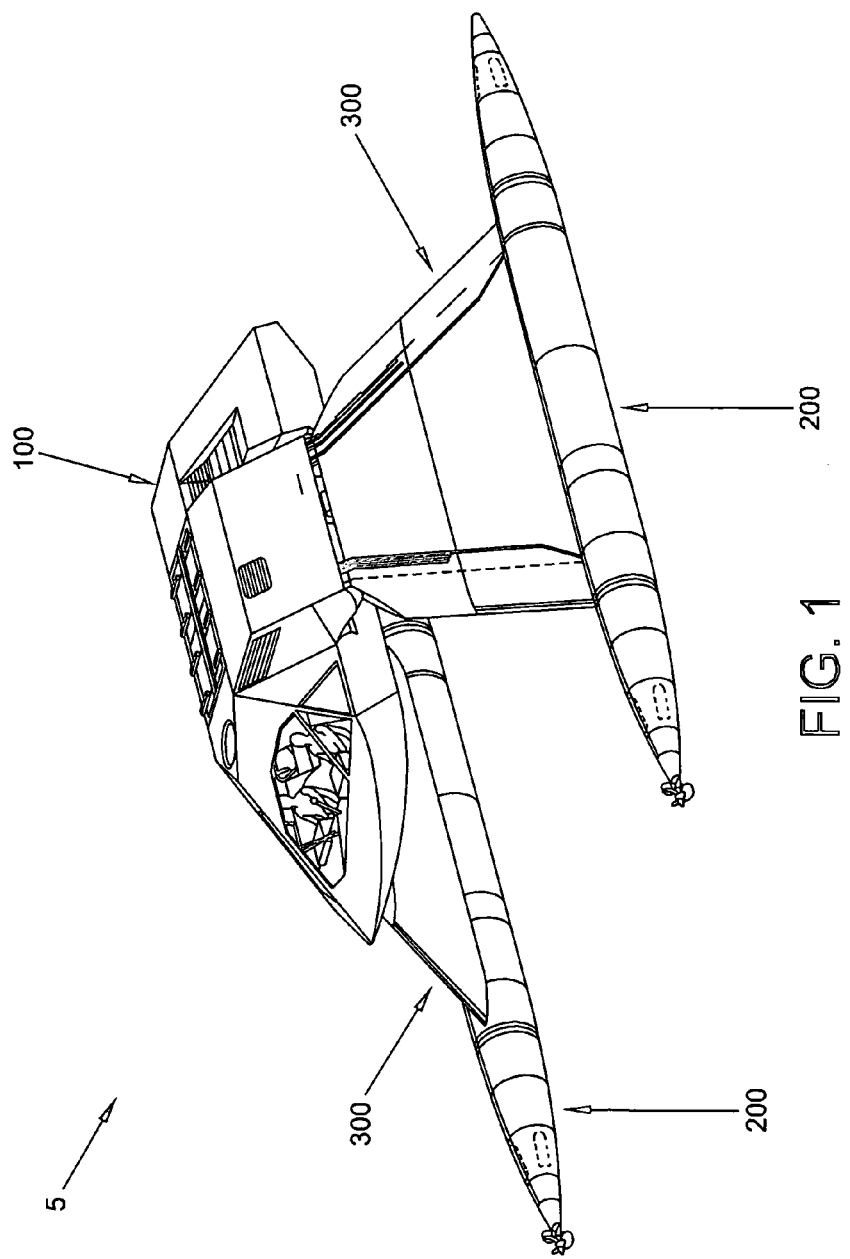
FIG. 1 is a schematic view showing a novel fleet protection attack craft formed in accordance with the present invention.
Figure 2:
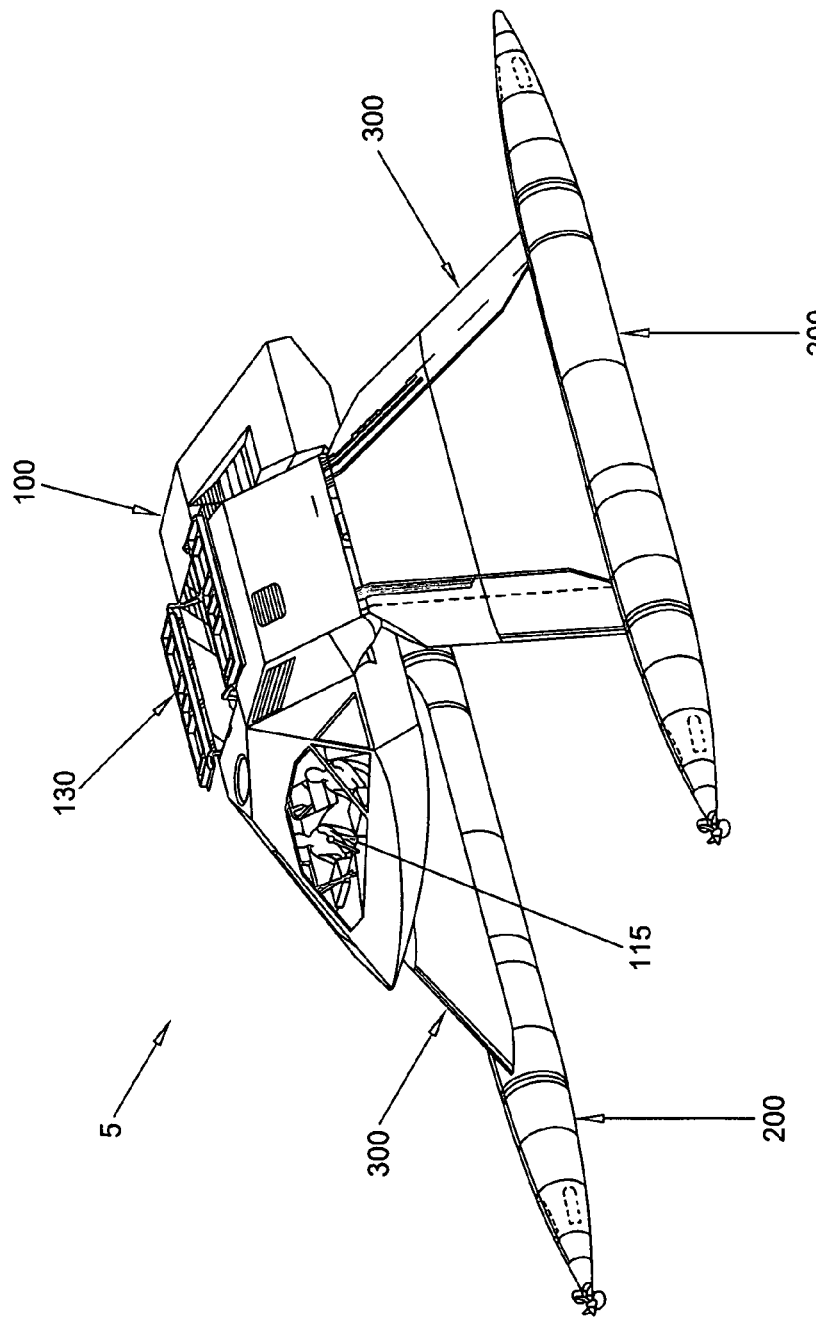
FIGS. 2-9 are schematic views showing further construction details of the novel attack craft shown in FIG. 1, including further details of its command module, buoyant tubular foils (BTFs) and struts.
Figure 3:
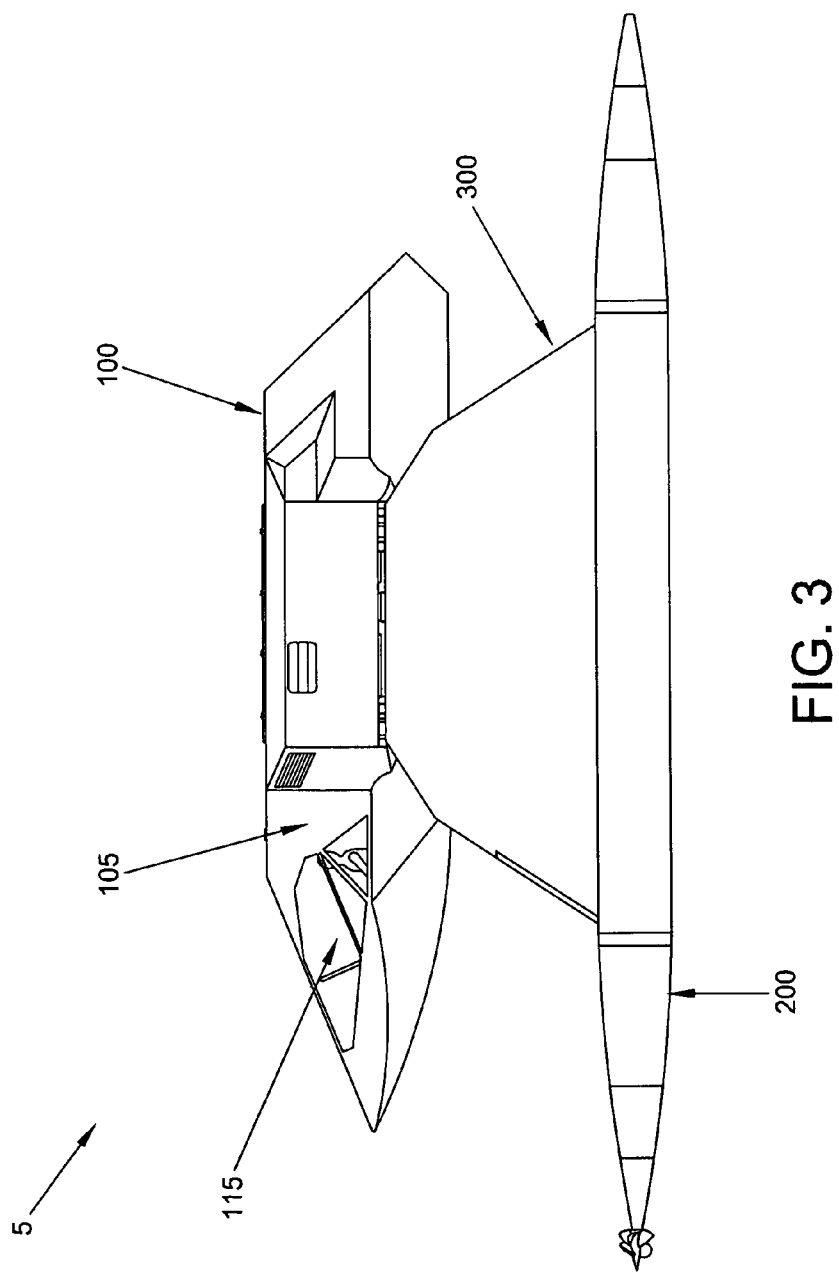
Figure 4:
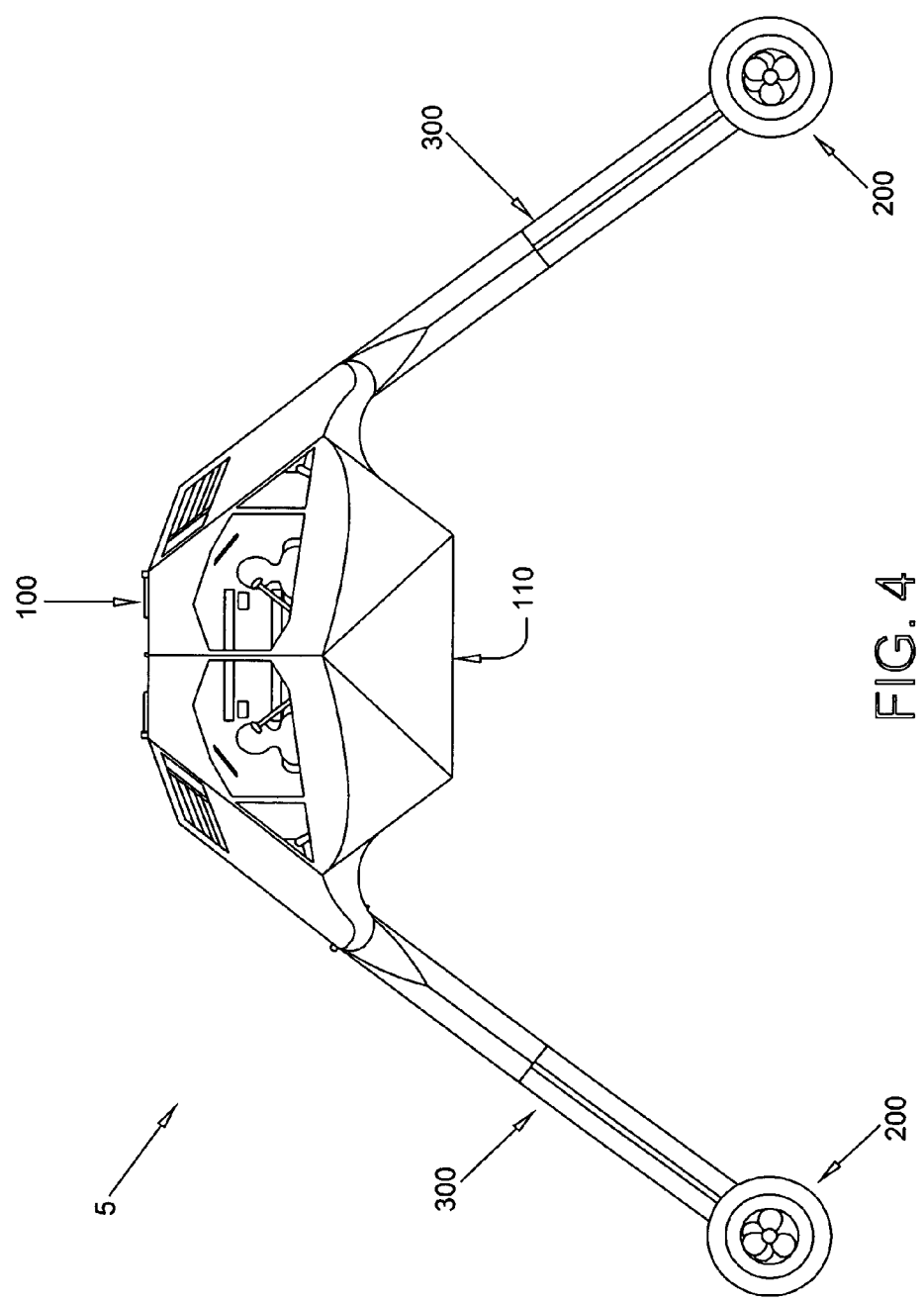
Figure 5:
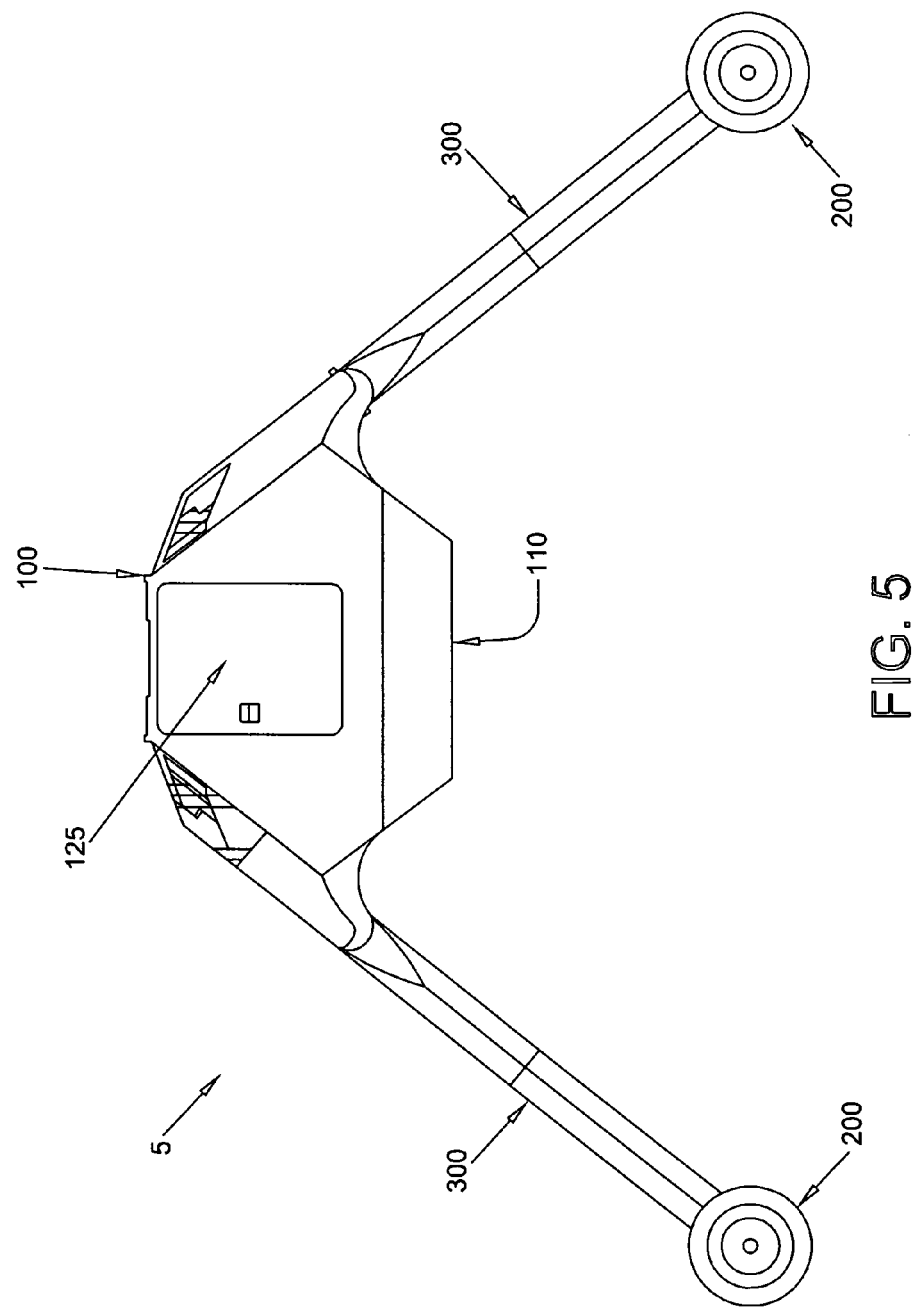
Figure 6:
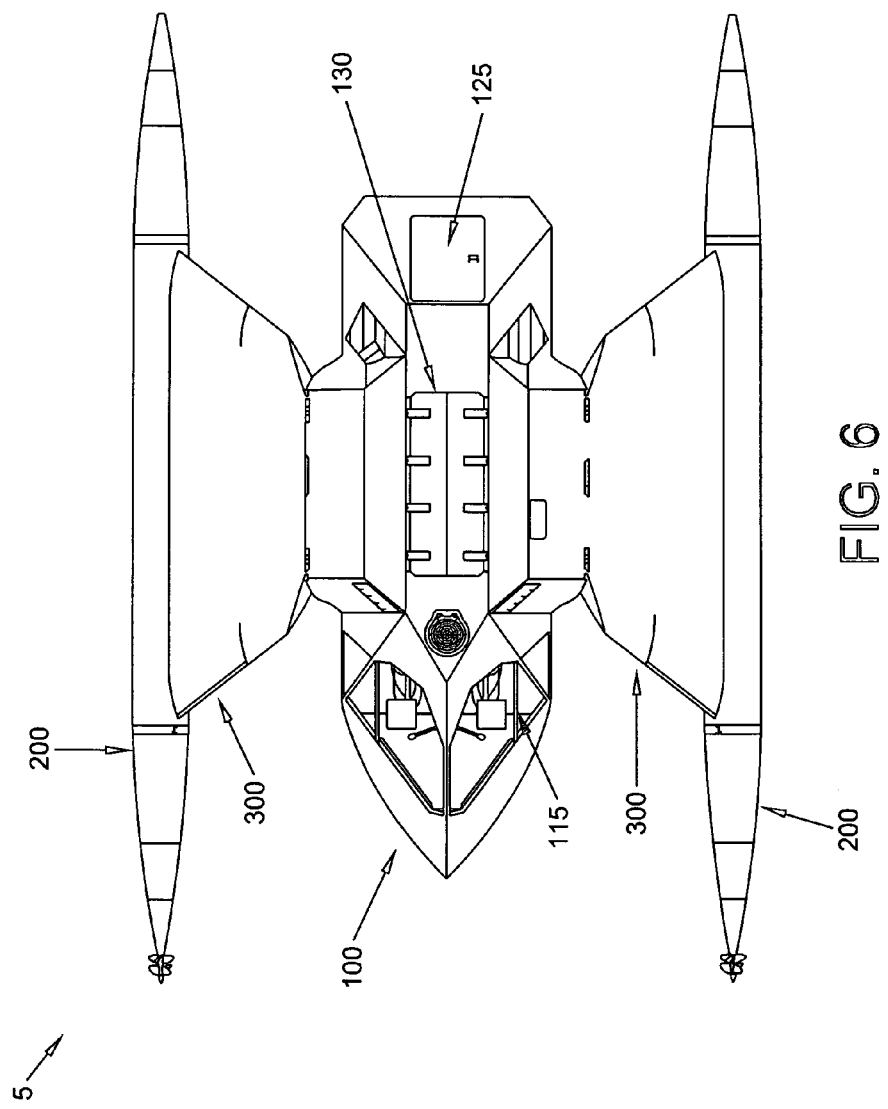
Figure 7:
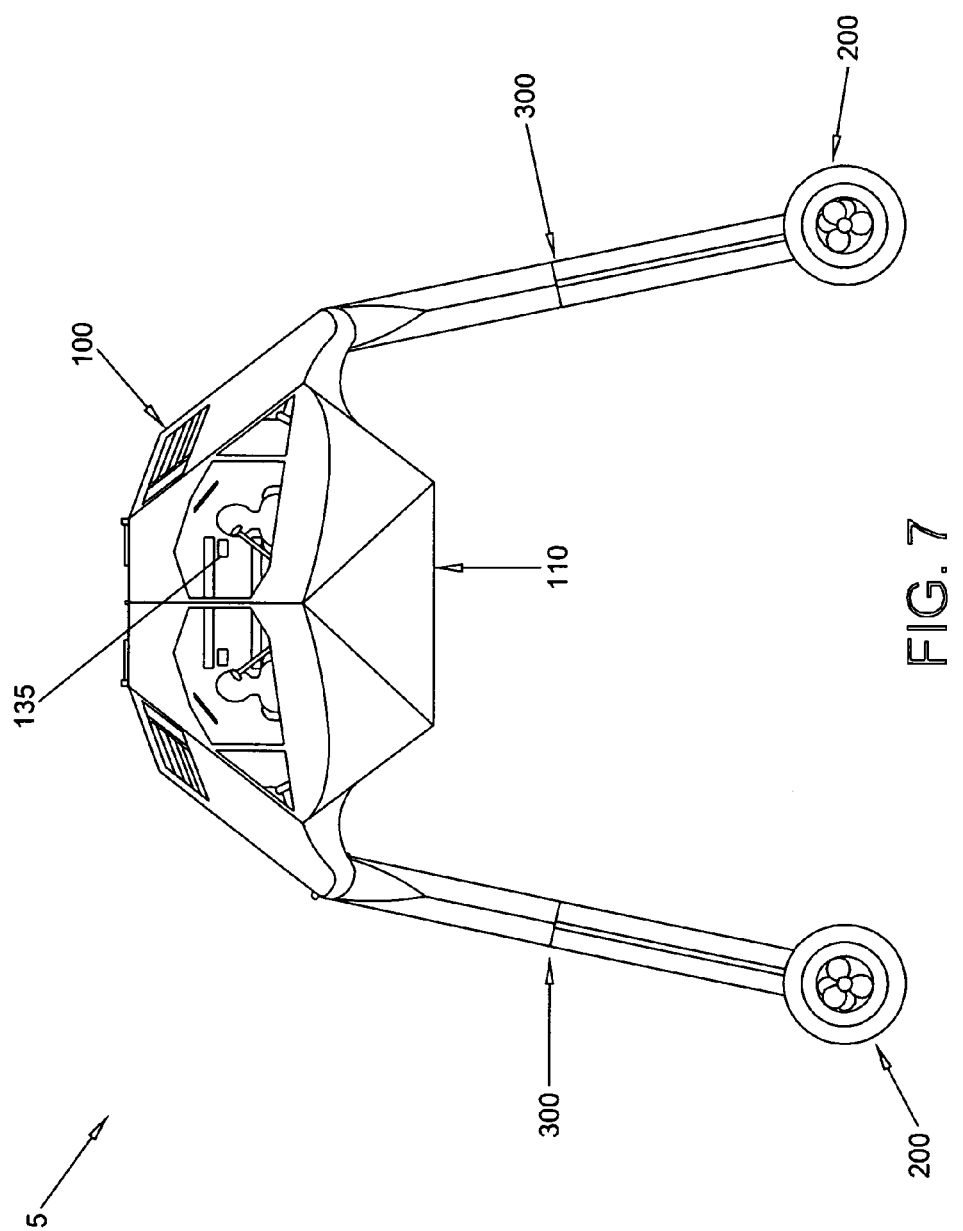
Figure 8:
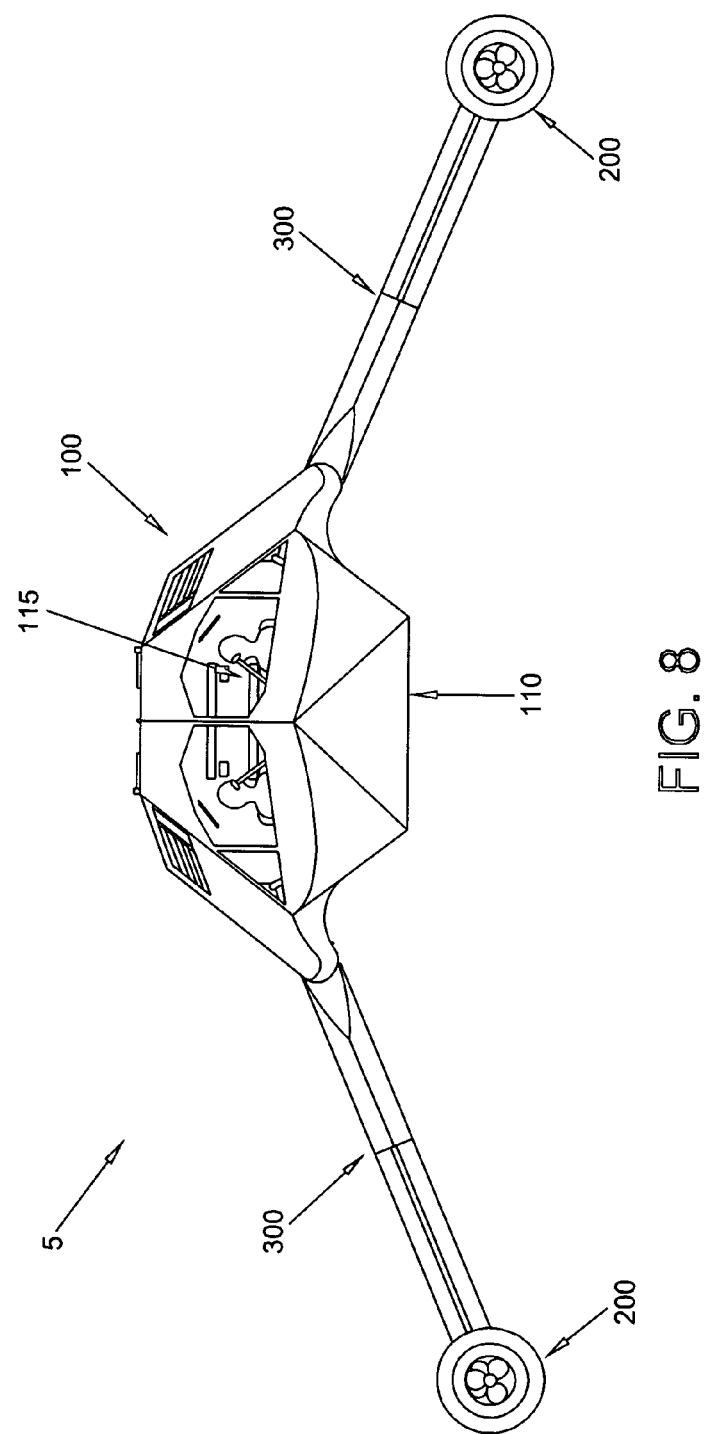
Figure 9:
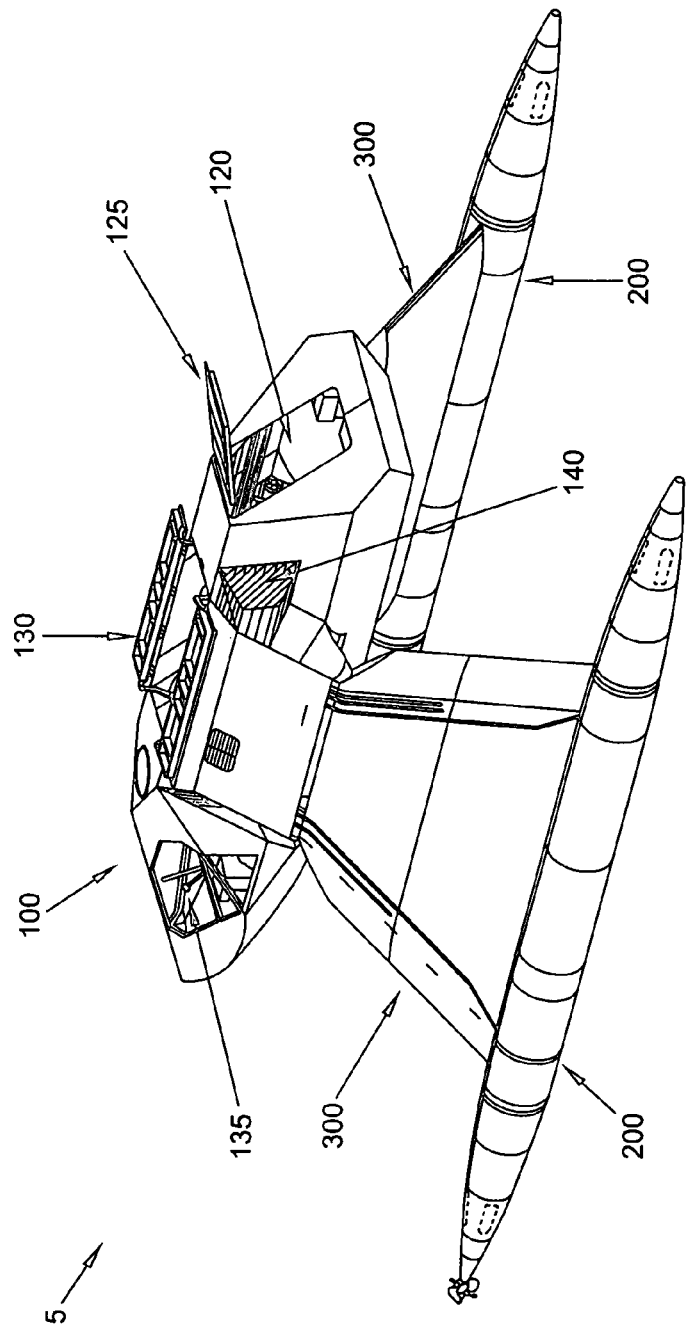
Figure 10:
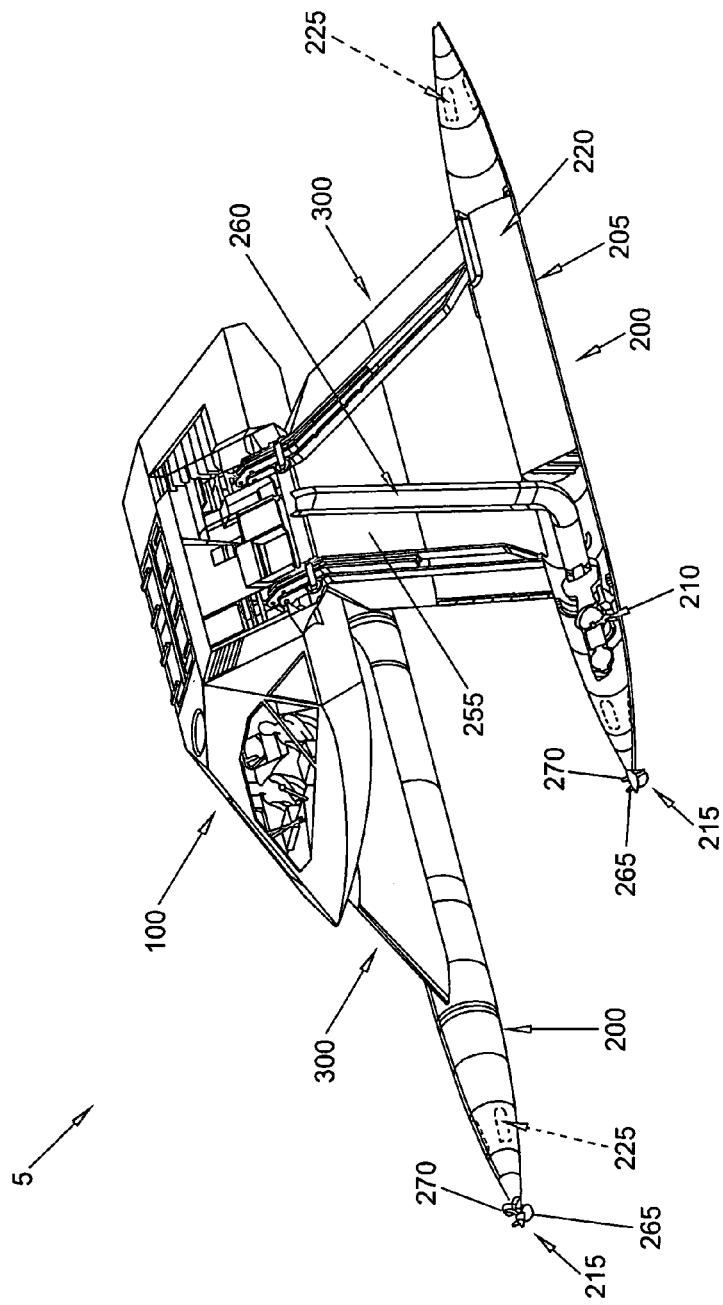
FIGS. 10-15 are schematic views showing further details of the BTFs and struts, and the internal components thereof.
Figure 11:
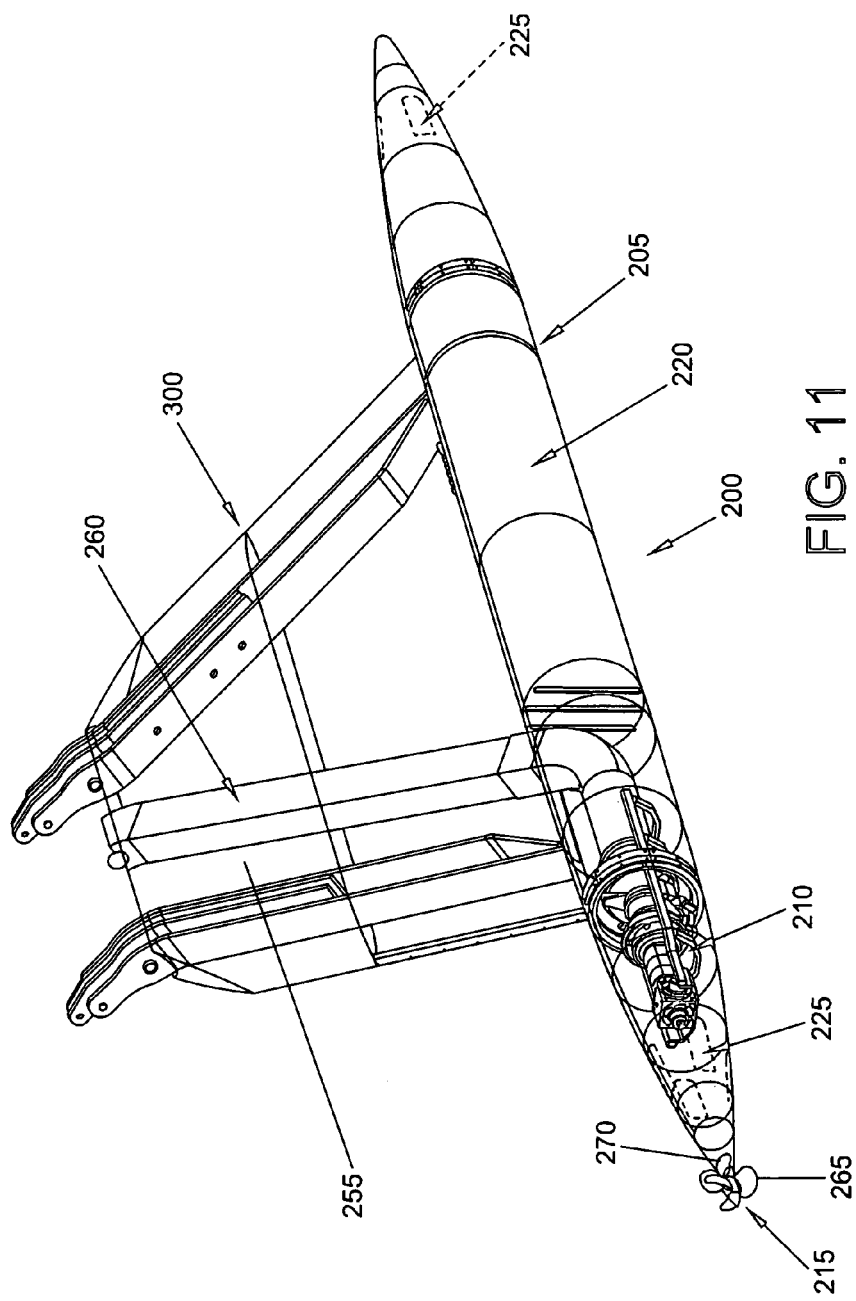
Figure 12:
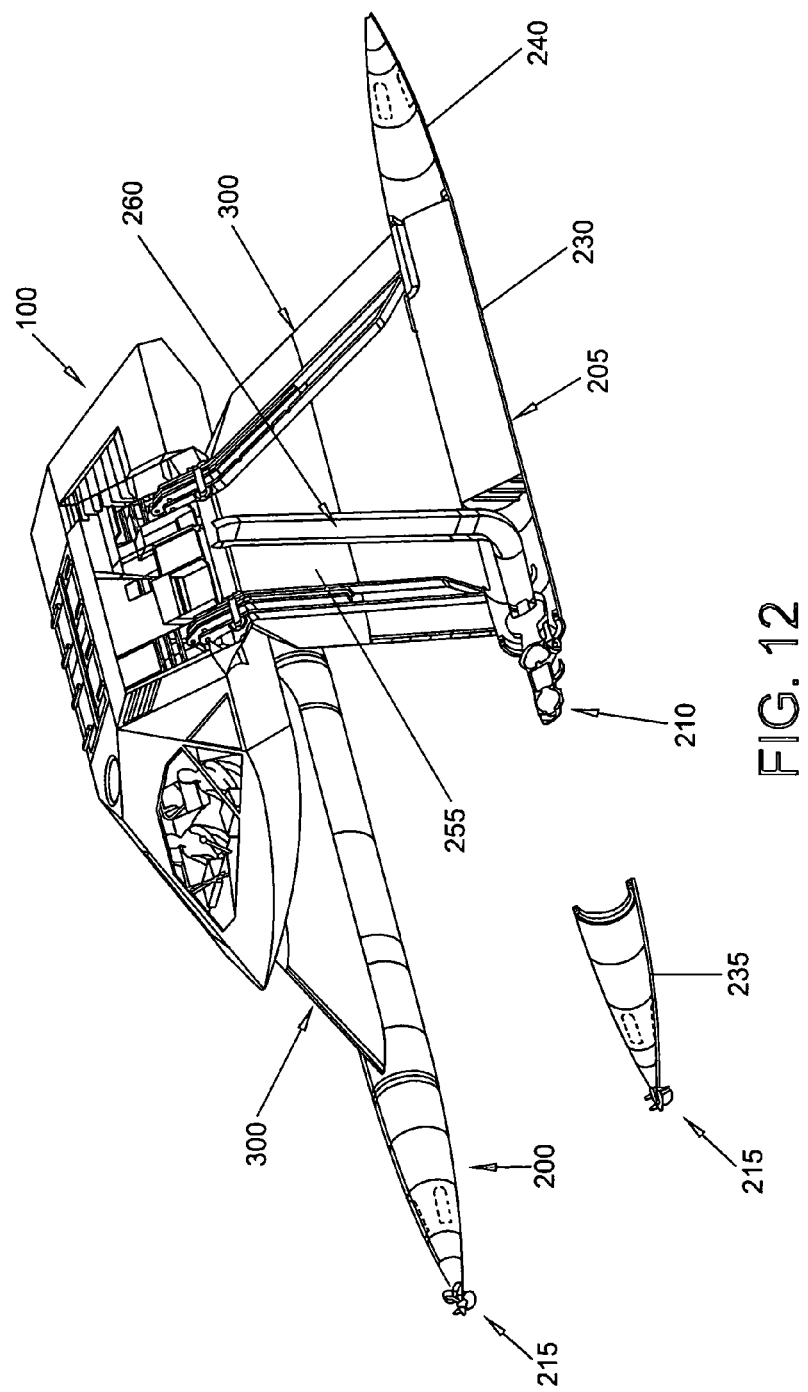
Figure 13:
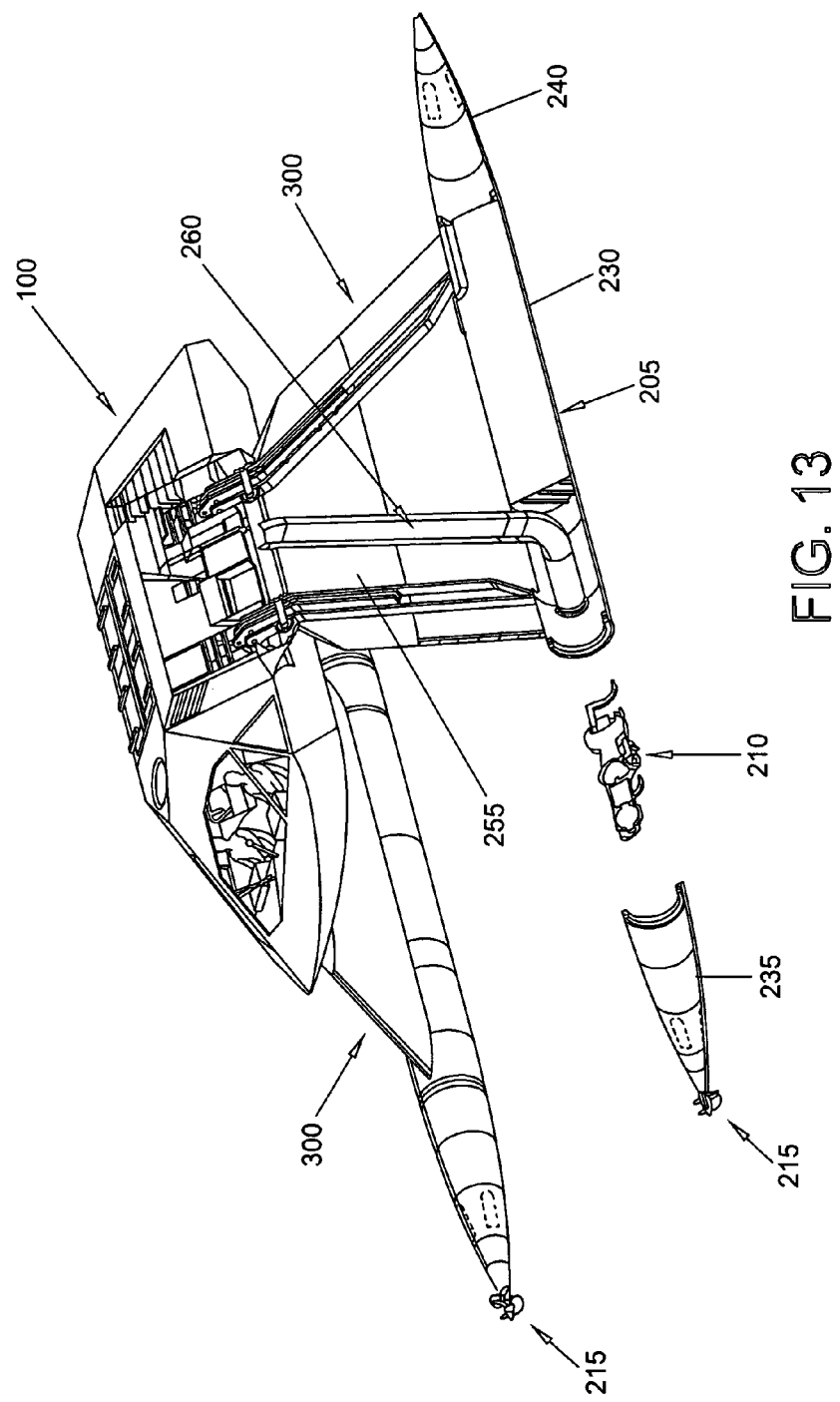

As seen in FIGS. 4, 7 and 8, and as will hereinafter be discussed in further detail, struts 300 can be disposed in a variety of different positions vis-à-vis command module 100, so that attack craft 5 can assume a number of different configurations, depending on the desired mode of operation, whereby to provide high speed, extreme stability and stealth capability.

Thus, for example, in standard seas, attack craft 5 might be placed in the configuration shown in FIG. 4 (i.e., so that struts 300 are disposed approximately 45 degrees off the horizon, and at approximately a right angle to one another) so that command module 100 is safely out of the water and the vessel has modest radar, infrared and visual signatures.

However, in high seas, while operating at high speed, attack craft 5 might be placed in the configuration shown in FIG. 7 (i.e., so that struts 300 are disposed substantially perpendicular to the horizon, and substantially parallel to one another) so that command module 100 stands well out of the water and is free from the affect of swells.

Furthermore, depending on sea conditions, attack craft 5 could be in a configuration somewhere between those shown in FIGS. 4 and 7.

Attack craft 5 is also designed to operate in stealth mode, by lowering its physical profile. In this case, attack craft 5 might be placed in the configuration shown in FIG. 8 (i.e., so that struts 300 are disposed almost parallel to the horizon, and almost co-linear with one another) so that command module 100 sits just above, or actually in, the water, reducing its radar, infrared and visual signatures. This mode can be very useful when attack craft 5 is being used for reconnaissance purposes and/or to deliver small teams of special forces behind enemy lines and/or to extract the same.

Thus, in one preferred form of the invention, attack craft 5 is normally operated in the configuration shown in FIG. 4, with command module 100 completely out of the water, but the command module being as low as possible so as to have a reduced profile. However, in high seas and at high speed, attack craft 5 may be operated on the configuration shown in FIG. 7, so that command module 100 stands well clear of any swells. And, when desired, attack craft 5 can be operated in the configuration shown in FIG. 8 so as to assume a stealth mode.

Or, attack craft 5 could be operated in a configuration somewhere between those shown in FIGS. 4, 7 and 8.

Prior Art Designs for Achieving High Speed and/or Extreme Stability

There are currently two competing approaches for achieving high speed and/or high stability in a water craft. These are (i) the hydrofoil approach, which generally provides high speed; and (ii) the SWATH approach, which generally provides high stability.

The Hydrofoil Approach

Hydrofoils have been in experimental use for many years, and today are in active service around the world for a variety of applications. Hydrofoils generally employ small airplane-like wings ("lifting foils") which provide lift for the hull of the vessel.

These lifting foils are typically lowered into the water while the vessel is underway. At higher speeds, the lifting foils are capable of lifting the hull of the vessel completely out of the water, thereby allowing the vessel to operate with only its lifting foils (and their supporting struts) in the water, whereby to minimize drag and increase vessel speed. However, the lifting foils themselves provide no buoyancy and therefore cannot support the vessel at slower speeds. Thus, the vessel can only operate in hydrofoil mode when moving at substantial speeds. In addition, due to the thin nature of the hyrdofoil's lifting foils, it is not possible to house the vessel's engines within the lifting foils themselves—instead, it is necessary to house the engines within the hull of the vessel and to use transmission technologies (e.g., mechanical, hydraulic and/or electrical means) to transfer power from the vessel's engines down to its lifting foils, which carry the propellers. However, these power transmission technologies all involve substantial losses in power (thereby necessitating the use of larger engines and/or resulting in lower speeds) and significantly complicate the propulsion system of the vessel.

The SWATH Approach

SWATH vessels employ two or more torpedo-shaped structures which are disposed underwater and attached to the main body of the vessel with fixed vertical struts. The torpedo-shaped structures provide buoyancy for the main body of the vessel, which remains completely out of the water. In this way, SWATH vessels resemble catamarans, except that the two pontoon hulls of the catamaran are replaced by underwater torpedo-shaped structures which reside immediately below the hull at the ends of the vertical struts. The SWATH design generally provides excellent stability because the underwater torpedo-shaped structures are less affected by wave action than a traditional wave-riding hull. However, the substantial skin friction, and the inefficient hydromantic shape, of the large underwater torpedo-shaped structures generally results in higher power consumption. This higher power consumption in turn necessitates the use of larger engines and/or results in reduced vessel speed. However, the use of larger engines is itself problematic, since the engines must then be housed in the hull or, if the engines are to be housed in the underwater torpedo-shaped structures, the underwater torpedo-shaped structures must be enlarged. Housing the engines in the hull introduces all of the power transmission problems discussed above with respect to hydrofoils, since the propellers are mounted to the underwater torpedo-shaped structures. Conversely, enlarging the underwater torpedo-shaped structures increases the skin friction problems, and the inefficient hydromantic shape problems, discussed above—which in turn necessitates the use of even larger engines. For this reason, it has previously been impossible to build a small, high-speed SWATH vessel. In addition to the foregoing, the SWATH design typically requires a high profile in order to ensure that the hull of the vessel remains completely out of water, particularly in high seas. This gives the SWATH vessel larger radar, infrared and visual signatures, thereby making it easy to detect and target.

Novel Approach for Achieving High Speed and Extreme Stability

The present invention overcomes the problems associated with the prior art through the provision and use of novel fleet protection attack craft 5. Attack craft 5 supports its command module 100 on a pair of buoyant tubular foils (BTFs) 200 via movable struts 300. BTFs 200 normally provide all of the buoyancy required for the craft, with command module 100 remaining completely out of the water. More particularly, BTFs 200 and struts 300 are normally the only portions of the craft which contact the water, and they provide low friction hydromantic cross-sections so as to minimize water resistance. Significantly, BTFs 200 house substantially all of the propulsion, fuel and steering systems for the craft, thereby providing the craft with an unusually low center of gravity and permitting the volume of command module 100 to be dedicated to crew, weapons and payload. Furthermore, struts 300 are movable relative to command module 100, thereby permitting the craft to assume a number of different configurations. This unique approach results in a craft with unparalleled speed and stability regardless of sea conditions, and with lower radar, infrared and visual signatures, thereby making it difficult to detect and target. Various aspects of the craft will now be discussed in further detail.

Command Module 100

Looking now at FIGS. 1-9, command module 100 generally comprises a watertight enclosure 105 (FIG. 3) having a hull-like bottom surface 110 (FIGS. 4, 5, 7 and 8). Command module 100 includes a cockpit 115 (FIGS. 2, 3, 6 and 8) for housing a pilot and weapons officer, and a bay 120 (FIG. 9) for housing weapons and payload (including passengers). Command module 100 includes a rear hatch 125 (FIGS. 5, 6 and 9) for permitting entry and exit of crew, weapons and payload (including passengers), and a top hatch 130 (FIGS. 2, 6 and 9) for permitting various weapons systems to be raised out of bay 120, fired, and then lowered back into bay 120.

Command module 100 is armored to protect all occupants, weaponry and payload. Windscreens 135 (FIGS. 7 and 9) are formed out of bullet-resistant materials.

Command module 100 comprises watertight bulkhead enclosures which, combined with hull-like bottom surface 110, allow waves to wash over the command module without effect when attack craft 5 is operating in its stealth mode (see below). Automatic vent doors seal any open systems against water leakage when attack craft 5 is in this stealth mode.

The outer structure of command module 100 is preferably based on so-called "stealth" principals in order to minimize the radar signature of the craft. More particularly, the outer surface of command module 100 is designed to deflect radar energy and return only a minimal amount of radar energy to the radar transmitter. To this end, the exterior surfaces of command module 100 are preferably highly angular, with the angles being selected so as to reflect the radar energy either downward towards the water or upward into the sky. In any case the exterior surfaces of command module 100 minimize the amount of radar energy reflected directly back to the sender. Furthermore, command module 100 preferably incorporates a radar-absorbent paint which is capable of absorbing or further reducing any incident radar energy.

Command module 100 is also configured to house all of the control systems for piloting the attack craft, all of the weapons control systems for operating the weapons carried by the attack craft, an auxiliary generator for supplemental power requirements (e.g., for navigation), a battery charger, an air filtration system, a head, a sink, an air compressor, etc.

The weapons systems carried by attack craft 5 preferably comprise (i) one 20 mm Vulcan Gatling gun, equipped with optic and night vision; (ii) two 30 caliber Miniguns equipped with optic and night vision; (iii) one or more 2.5 inch laser-guided rockets; and (iv) 8 "mini" torpedoes. Preferably the Gatling gun, Miniguns and rockets are housed within bay 120 for elevated deployment through top hatch 130, and the "mini" torpedoes are mounted to the exterior of command module 100, e.g., such as is shown at 140.

Buoyant Tubular Foils (BTFs) 200

Looking next at FIGS. 10-15, a pair of buoyant tubular foils (BTFs) 200 provide buoyancy, propulsion and steering for attack craft 5. Each of the BTFs 200 generally comprises a hollow tubular structure 205 which houses an engine 210 for powering a propeller system 215, a fuel tank 220 for supplying fuel to engine 210, and steering elements (or spoilers) 225 for steering attack craft 5.

Hollow Tubular Structure 205

Hollow tubular structure 205 generally comprises a hollow hull which provides buoyancy for attack craft 5. Hollow tubular structure 205 is configured so as to provide stability at low speed operations while still providing low water friction and an improved hydromantic profile so as to enable speeds of over 80 knots. At high speeds, the configuration of hollow tubular structure 205 provides extraordinary stability for the vessel, due to the flow of water over the elongated tubular structure.

More particularly, the low friction hydromantic cross-section of hollow tubular structure 205 traverses water with the lowest possible skin friction forces and the best hydromantic shape obtainable, yet still houses engine 210 and fuel tank 220, and supports propeller system 215 and steering elements 225. It has been determined that best performance is achieved where hollow tubular structure 205 has a cross-section which is between about 1/10 and about 1/30 of the length of hollow tubular structure 205, and preferably about 1/20 of the length of the hollow tubular structure. By way of example but not limitation, excellent performance can be achieved where hollow tubular structure 205 has a 3 foot outer diameter and a 60 foot length.

Figure 14:
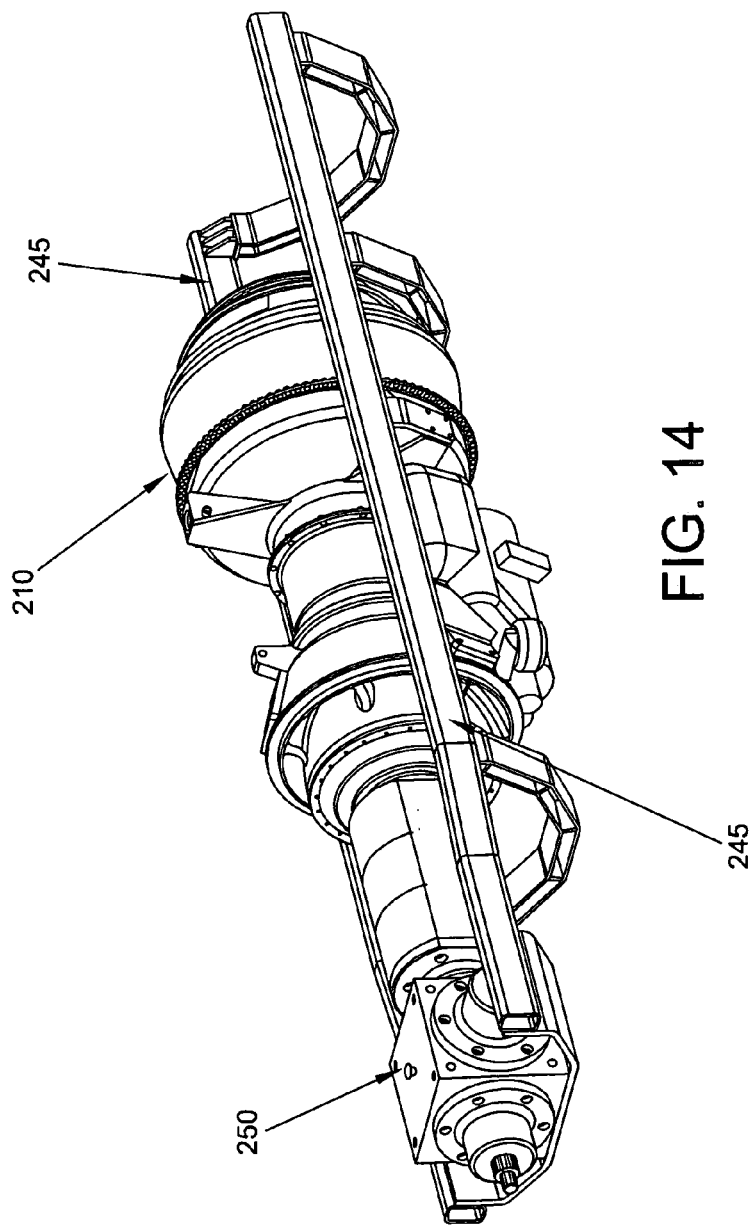
Figure 15:
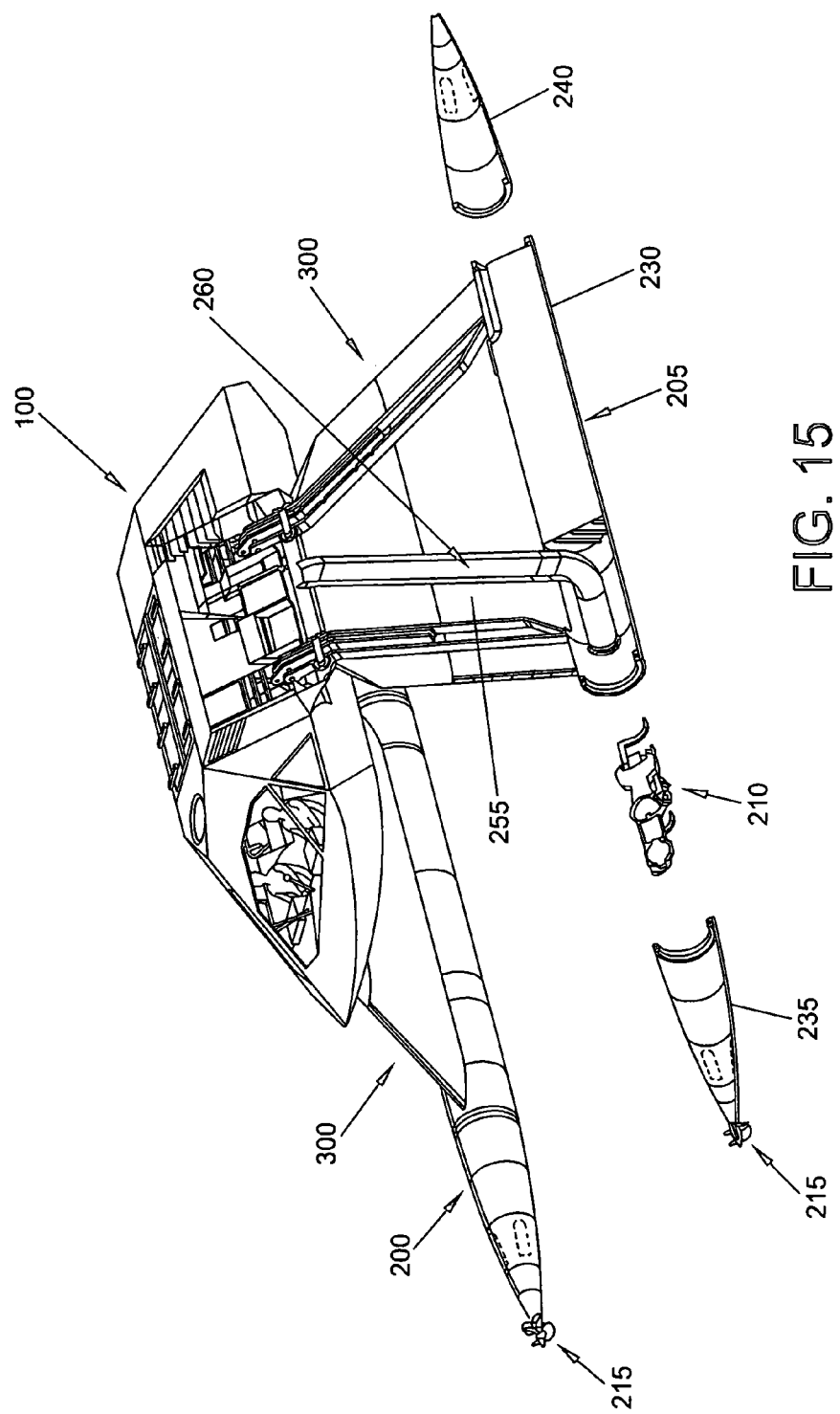
Figure 16:
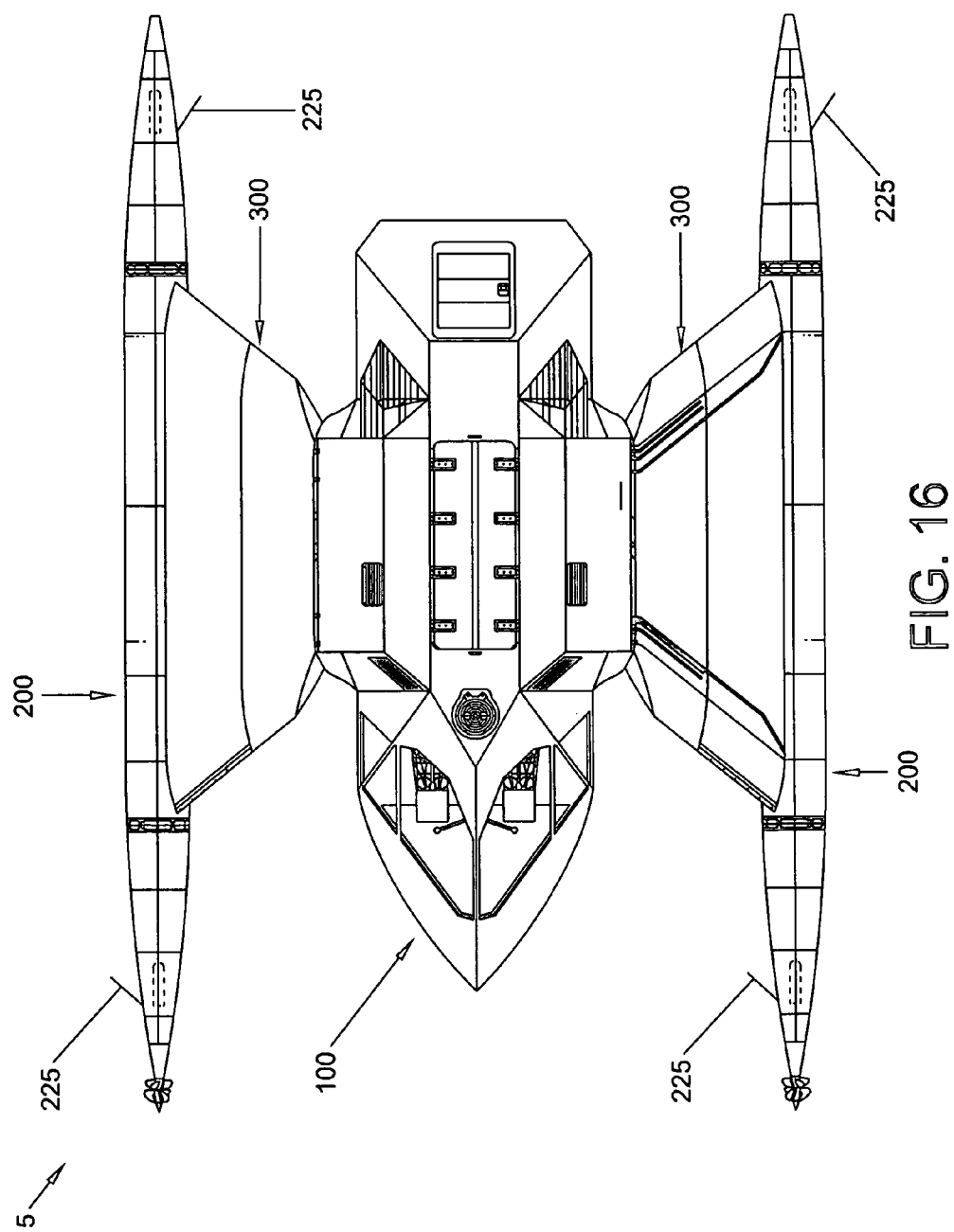
FIGS. 16-26 are schematic views showing further details of the spoilers used to steer the novel attack craft and adjust its attitude.
Figure 17:
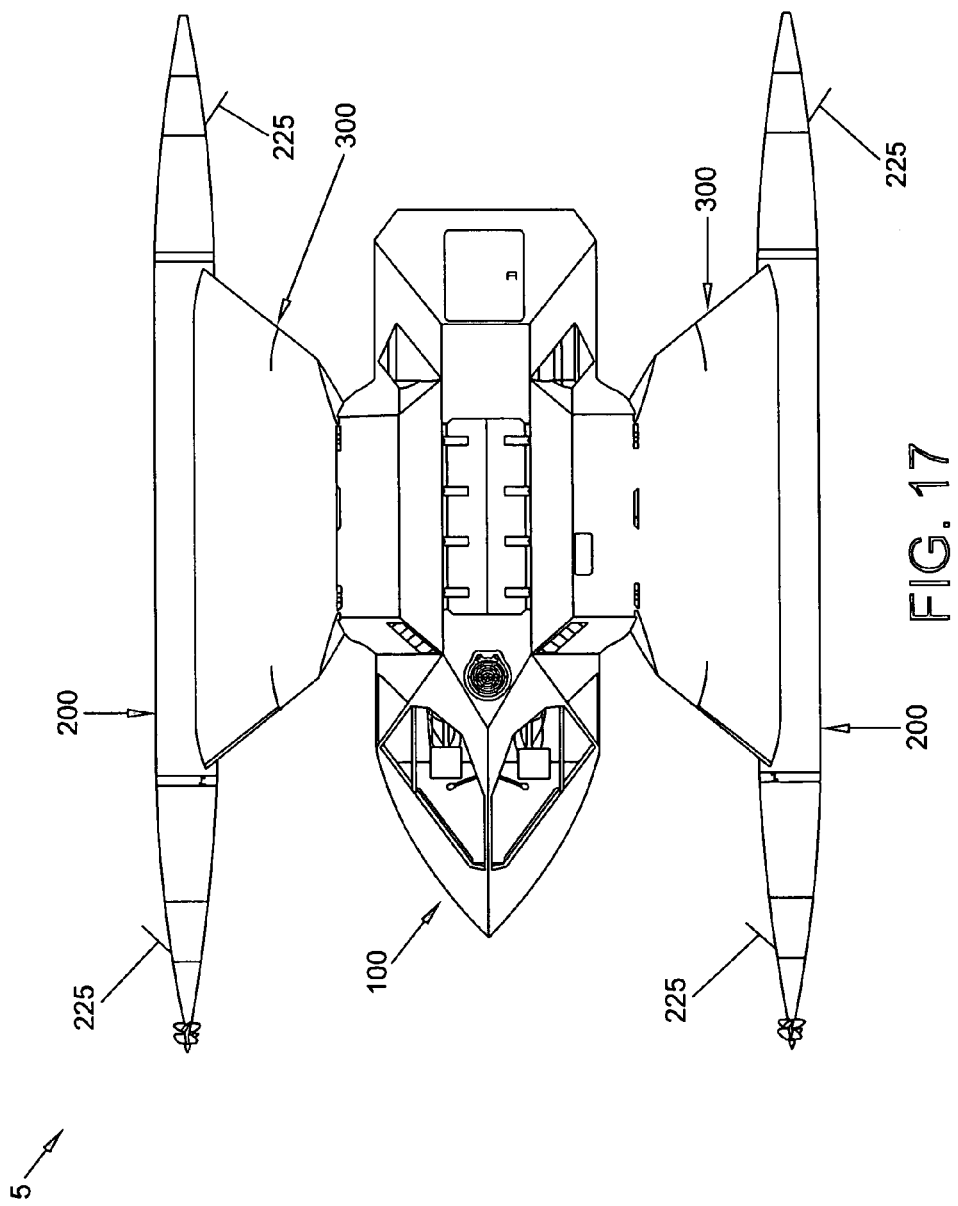
Figure 18:
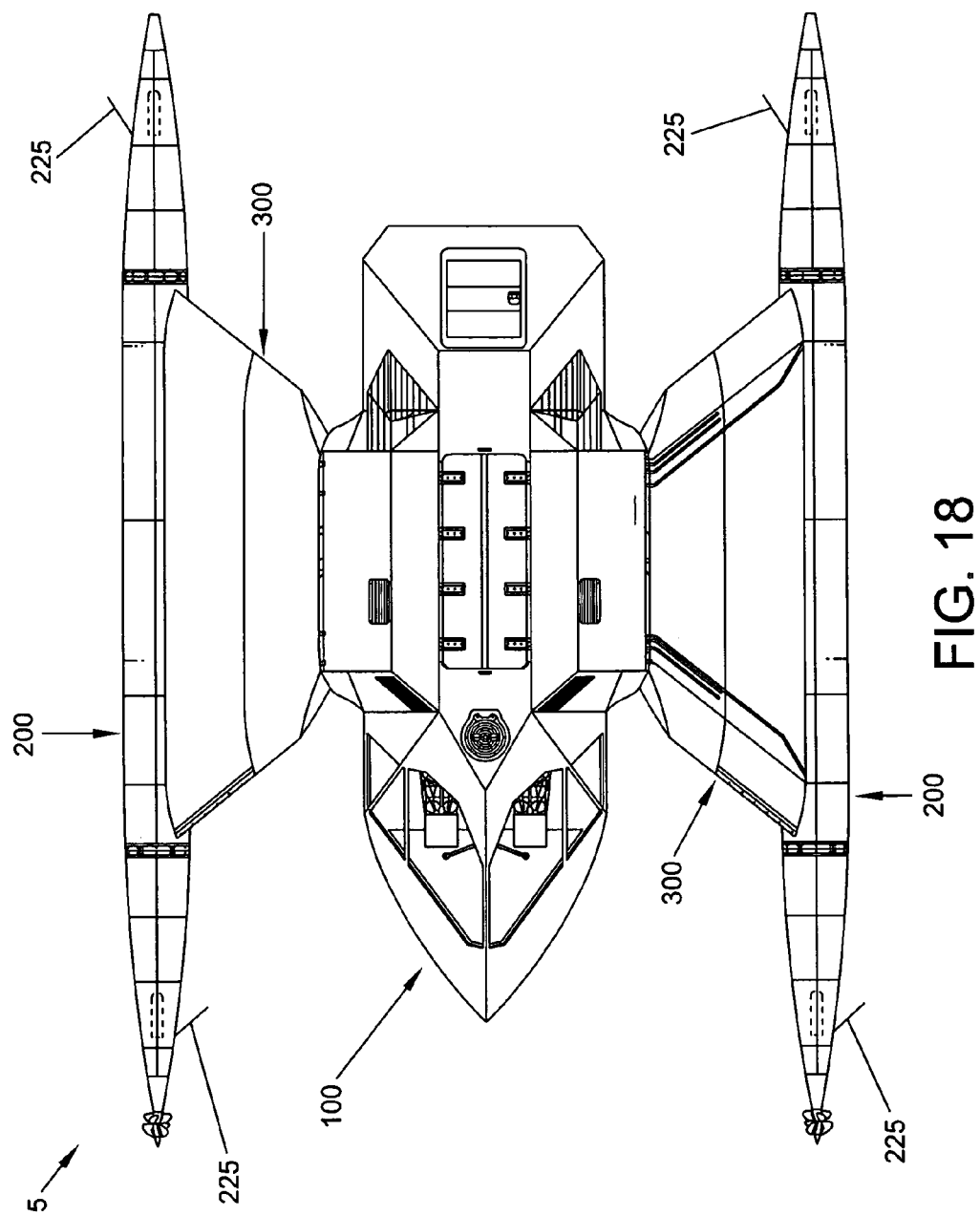
Figure 19:
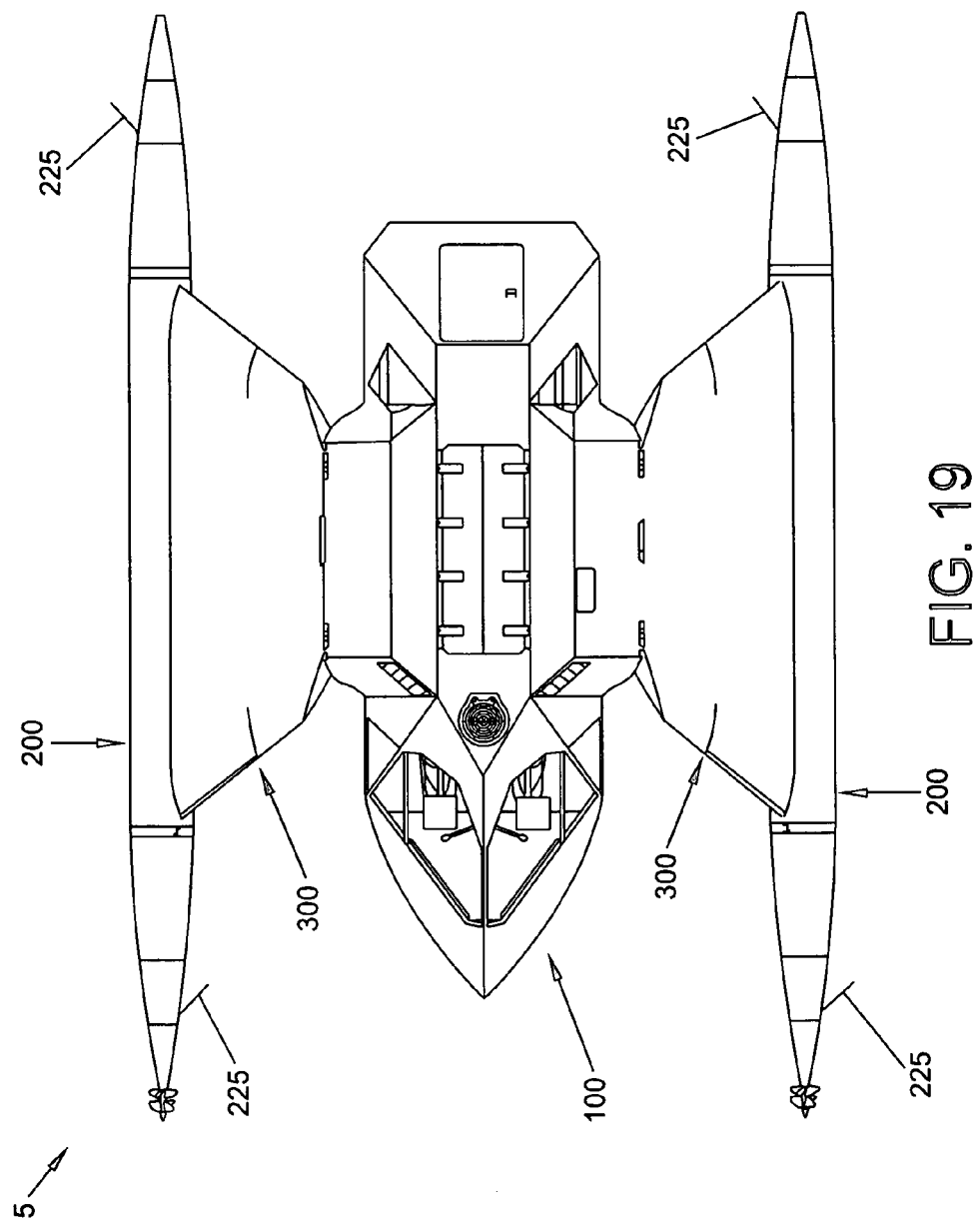
Figure 20:
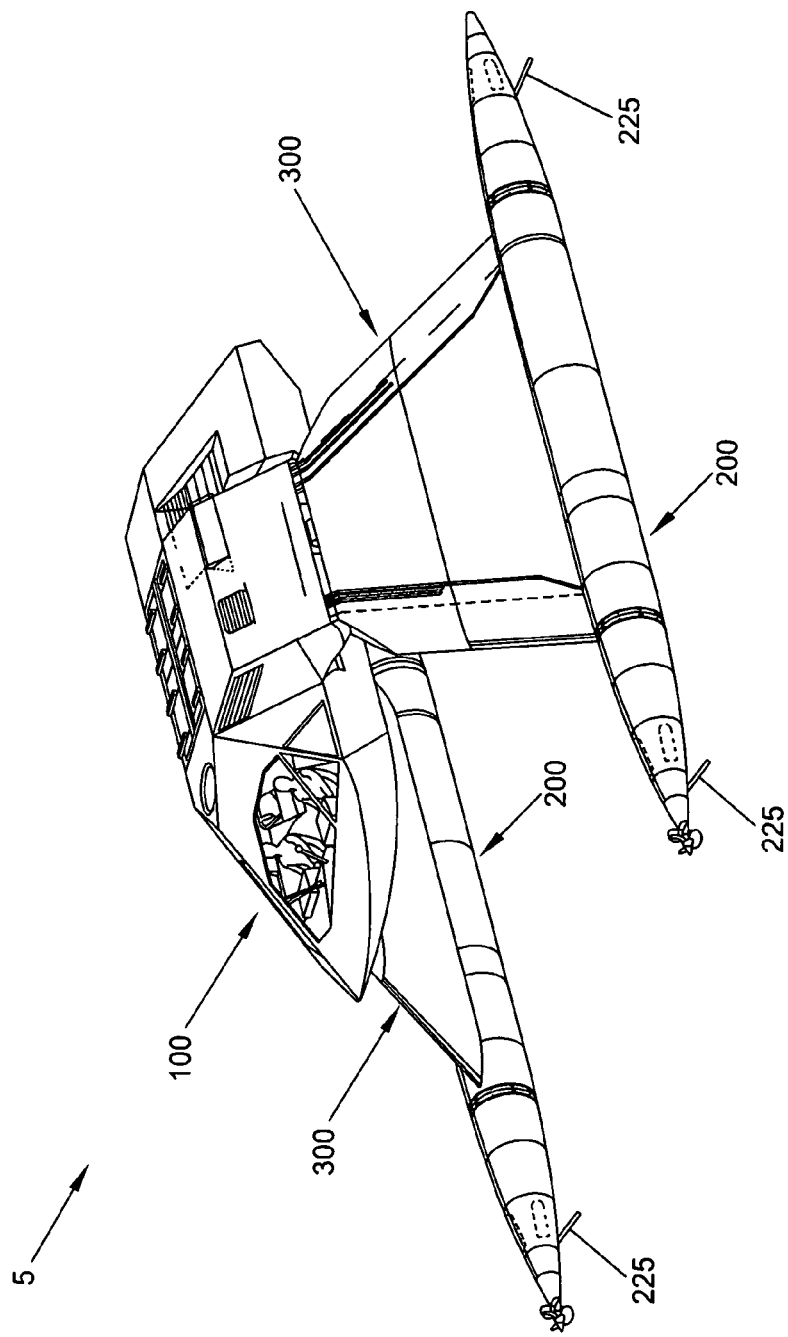
Figure 21:
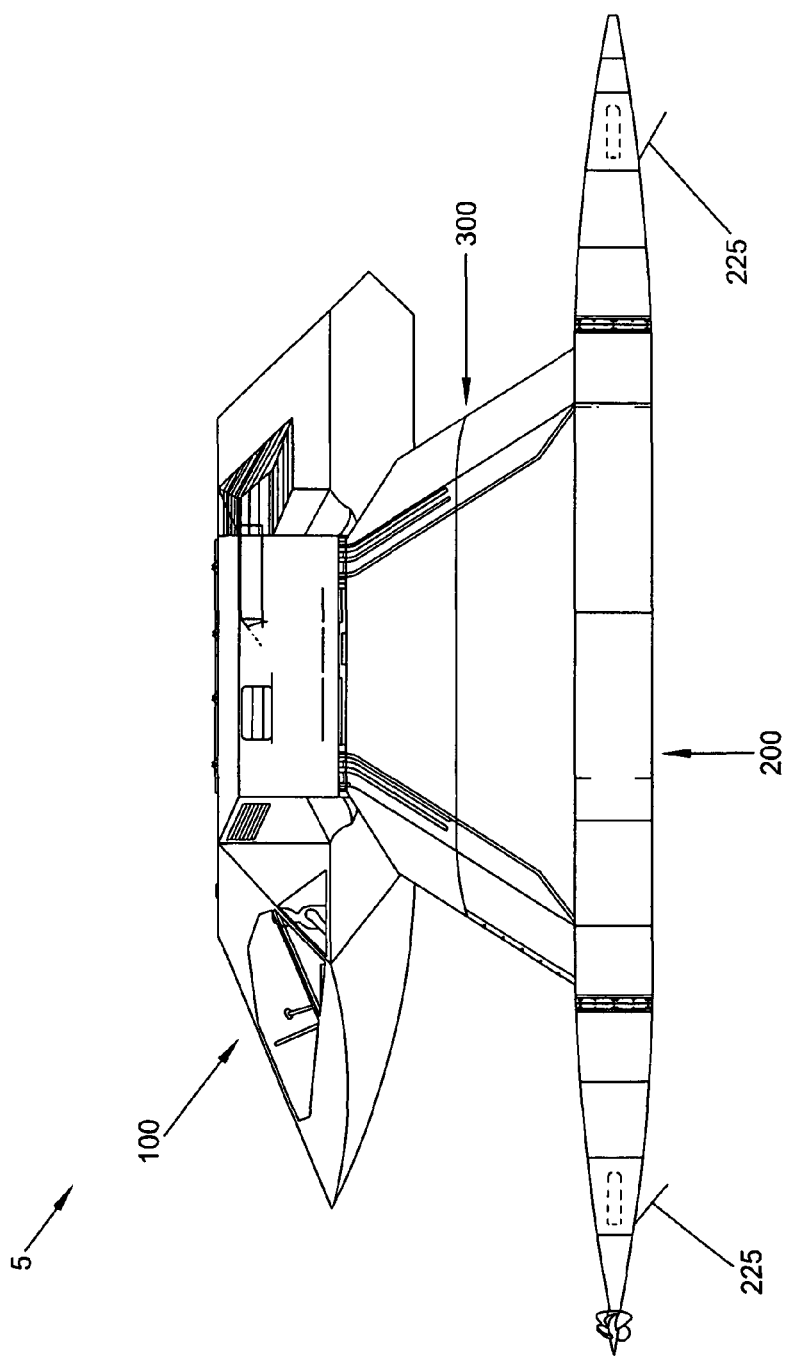
Figure 22:
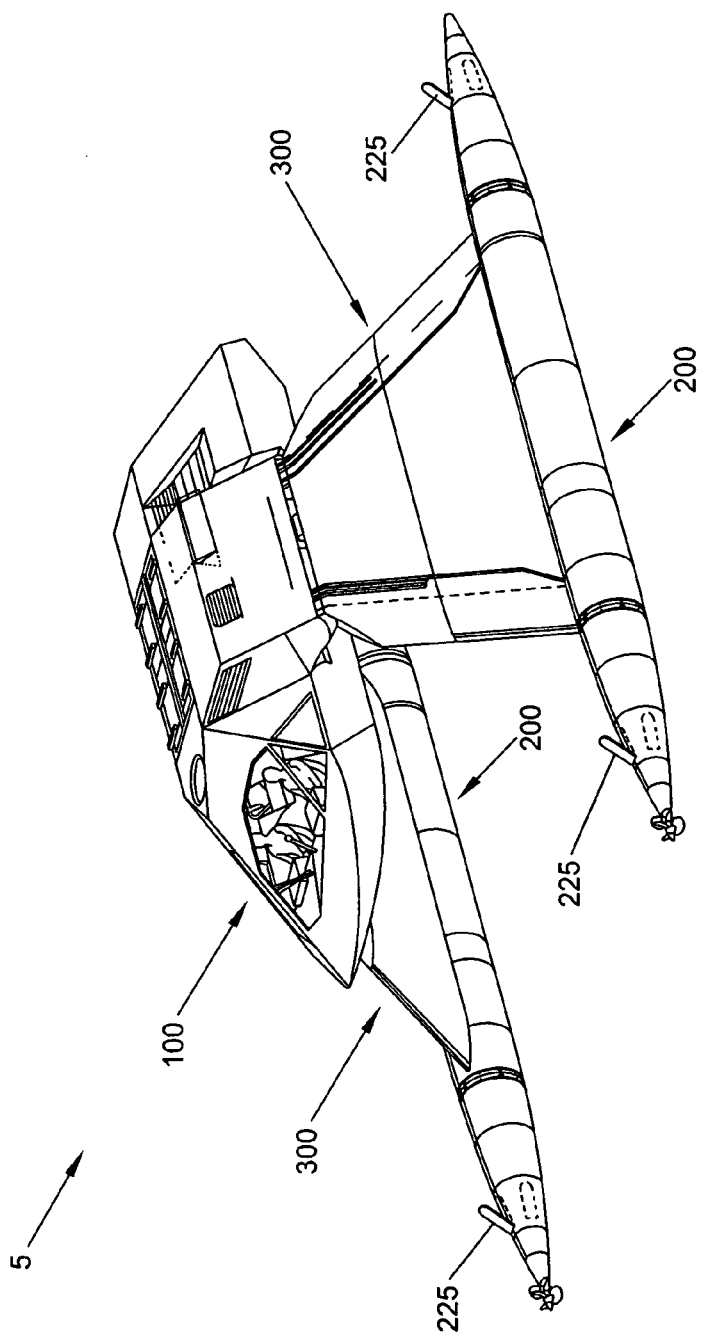
Figure 23:
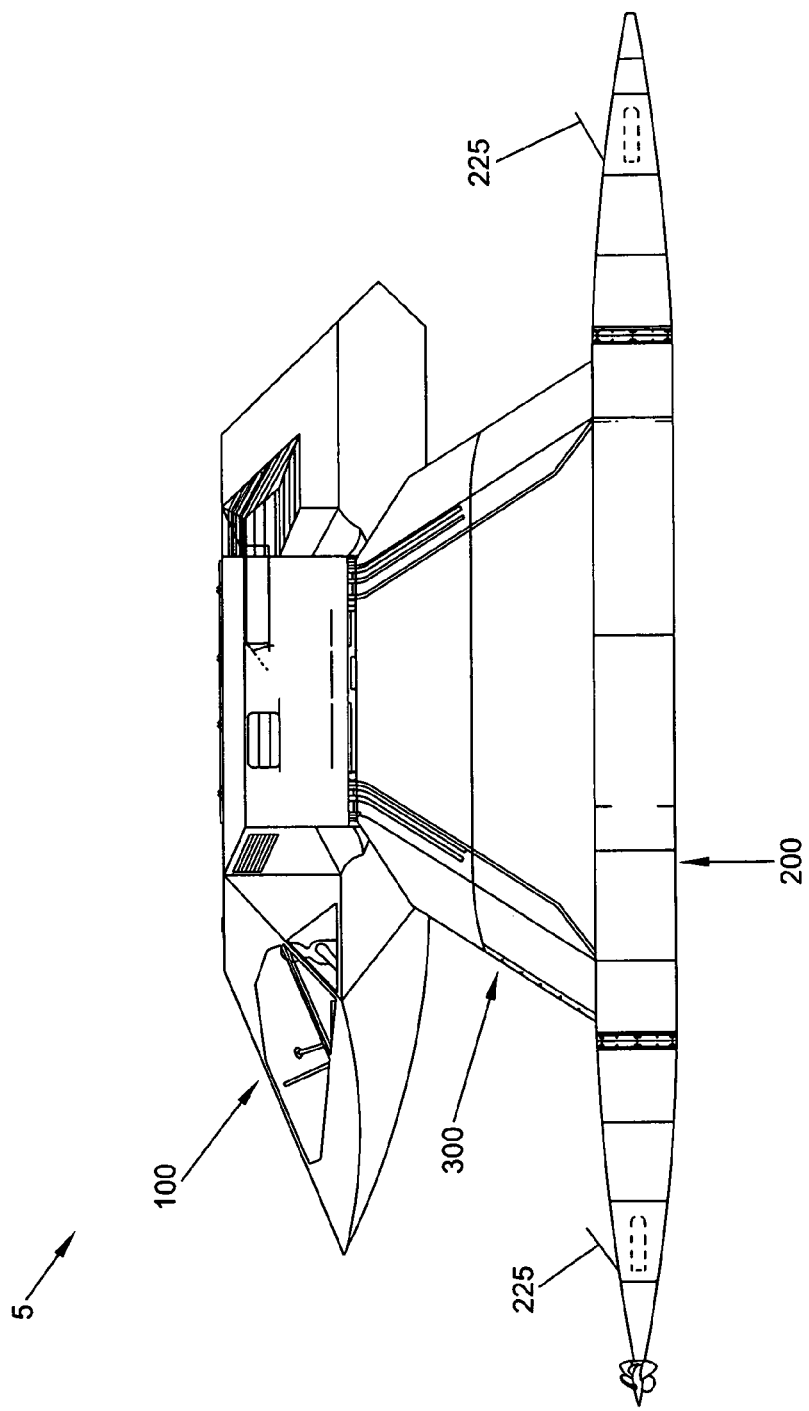

As seen in FIGS. 12-15, hollow tubular structure 205 comprises a plurality of disconnectable sections that permit easy access to components disposed within the interior of hollow tubular structure 205, e.g., for maintenance and quick replacement of power and sensor modules. By way of example but not limitation, hollow tubular structure 205 can comprise a center section 230 which is mounted to a strut 300, a forward section 235 which is dismountable from center section 230, and a rear section 240 which is dismountable from center section 230. Preferably, interior components may be equipped with slides for easy entry into, and removal from, hollow tubular structure 205. By way of example but not limitation, FIG. 14 shows how engine 210 may be equipped with slides 245 for supporting engine 210 within hollow tubular section 205, and to facilitate insertion into, and removal from, hollow tubular structure 205.

Front section 235 and rear section 240 can mount to center section 230 in a variety of ways. By way of example but not limitation, the sections can be mechanically held together (e.g., by hydraulics, power screw actions, etc.) or they can twist lock together. (e.g., in the manner of a bayonet-type mount). A watertight seal is provided between the sections so as to ensure hull integrity. The seal can be a continuous circular shape to match the cross-section of hollow tubular structure 205, e.g., a resilient O-ring having a round or flat cross-section. Alternatively, the O-ring can be an inflatable seal (e.g., like the inner tube of a bicycle tire) that can provide adjustable sealing forces by the injection of an appropriate amount of fluid (e.g., gas or liquid). Preferably, each O-ring seal has two sealing surfaces, i.e., the face surface between adjacent sections and the face surface against the skin of hollow tubular structure 205.

The ability to quickly unlock the various sections of hollow tubular structure 205 permits the rapid servicing and/or replacement of the various components contained within hollow tubular structure 205, e.g., engine 210, fuel tank 220, etc.

Gas Turbine (Jet) Engine Propulsion

Engine 210 can be a conventional diesel engine, internal combustion engine, rotary engine, electric motor, etc. Preferably, however, engine 210 comprises a gas turbine (jet) engine, e.g., of the sort used in aircraft, and particularly of the sort used in helicopters. A gas turbine engine is preferred due to its high power, small size and low weight. More particularly, a gas turbine engine typically has a horsepower-to-weight ratio of about 2.5 horsepower (HP) per pound. By comparison, a modern marine diesel engine typically has a horsepower-to-weight ratio of about 0.5 HP per pound. Since there is generally a direct correlation between vessel acceleration and weight, it is generally desirable to use a high power, low weight engine when designing a high speed craft. Thus, a gas turbine engine is the preferred propulsion unit for attack craft 5.

Significantly, a gas turbine engine is also ideal for use in attack craft 5 since its size and configuration is perfectly suited for disposition within hollow tubular structure 205. More particularly, gas turbine engines typically have an elongated, somewhat cylindrical configuration which easily fits within a hollow tubular structure. Significantly, gas turbine engines generally have relatively modest cross-sections, such that the gas turbine engines can fit within a relatively small diameter tube. By way of example but not limitation, the T53L13 gas turbine (jet) engine manufactured by Lycoming Engines (a division of Avco Corporation, a wholly owned subsidiary of Textron, Inc.) of Williamsport, Pa. has a diameter which is ideally suited for disposition within hollow tubular structure 205 of attack craft 5.

The use of a gas turbine engine in BTFs 200 also provides significant additional advantages.

First, the use of a gas turbine engine in each BTF 200 easily allows for the use of a centerline drive shaft to transfer power to propeller system 215. This is an enormous advantage when it comes to efficiently delivering large amounts of power to propeller system 215.

Second, the gas turbine engine provides a starter generator that performs two functions, i.e., (i) to start the turbine engine, and (ii) to generate DC power. More particularly, most gas turbine engines provide 24 volts DC at 300 amps. This allows attack craft 5 to power all of its electrical systems from the gas turbine engines, with the need for only a small supplemental generator for charging batteries.

In addition, placing a gas turbine engine inside hollow tubular structure 205, which is always underwater, also provides superior cooling for the gas turbine engine since the radiated engine heat is transferred to the surrounding water through the skin of hollow tubular structure 205.

Furthermore, gas turbine engines are generally designed to be quickly and easily removed (e.g., by sliding) from an aircraft fuselage. Similarly, the gas turbine engine can be quickly and easily removed (e.g., by sliding) from hollow tubular structure 205.

The gas turbine engine usually has a high internal rpm (greater than 19,000 rpm) with internal gear reductions. Preferably, a gearbox 250 using planetary gears connects engine 210 to propeller system 215. This approach provides a gearbox which is smaller than the outside diameter of the gas turbine engine.

Gas Turbine (Jet) Engine Intake and Exhaust

The "Achilles heel" of a gas turbine engine is its need to rapidly intake large quantities of fresh air and to rapidly expel large quantities of exhaust air. As a result of this need to rapidly move large quantities of air in and out of the gas turbine engine, gas turbine engines have not heretofore been a candidate for use in underwater structures (e.g., submarines and the submerged portions of SWATH vessels) due to the inability to adequately aspirate the jet engines.

A critical aspect of attack craft 5 is the air intake and exhaust systems which support the use of gas turbine engines underwater. In this respect it will be appreciated that the design of the air intake and exhaust systems is complicated by the fact that attack craft 5 is designed to change configurations (e.g., as shown in FIGS. 4, 7 and 8) and the air intake and exhaust systems must be able to accommodate these configuration changes. More particularly, with attack craft 5, the gas turbine engines are housed underwater in BTFs 200, the BTFs 200 are disposed at the ends of struts 300, and struts 300 are movable relative to command module 100 (see FIGS. 4, 7 and 8). Thus, the air intake and exhaust systems of attack craft 5 must be capable of rapidly moving large quantities of air in and out of the gas turbine engines, and through struts 300, while at the same time accommodating movement of struts 300 relative to command module 100.

To this end, attack craft 5 comprises an air intake and exhaust system for rapidly delivering large quantities of fresh air to gas turbine engine 210 and for rapidly expelling large quantities of exhaust air from gas turbine engine 210. The air intake and exhaust system generally comprises an engine intake duct 255 and an engine exhaust duct 260. The intake side of engine intake duct 255 is disposed in command module 100 so that it can access cool air, which increases the efficiency of gas turbine engines 210. Preferably, the intake side of engine intake duct 255 is funneled so as to generate ram air forces while attack craft 5 is moving at speed, which further increase the efficiency of gas turbine engines 210. The outlet side of engine exhaust duct 260 is disposed in command module 100 so as to provide efficient exhaust venting with a minimal heat signature. Engine intake duct 255 and engine exhaust duct 260 preferably pass through a flexible coupling located at the junction of the strut and the command module, in order to accommodate movement of the strut vis-à-vis the command module. This flexible coupling also accommodates other lines passing from command module 100 to BTFs 200 via struts 300, e.g., fuel re-fill lines, electrical power lines, electrical control lines, etc.

It should be appreciated that the flexible coupling is configured so as to allow engine intake and engine exhaust to be vectored and bent while still accommodating the large gas volumes associated with the gas turbine engine. Furthermore, the flexible coupling is designed to accommodate the high exhaust temperatures created by the gas turbine engine. The use of heat-resistant flexible materials in the coupling is essential to allow movement of the struts relative to the command module.

It should also be appreciated that moving large quantities of air through a narrow strut (which is thinner than BTF 200) entails using substantially the entire inner structure of the strut as an air intake duct and an engine exhaust duct. In one preferred form of the invention, engine exhaust duct 260 is routed inside air intake duct 255 so as to allow the exhaust to be cooled by the intake air, whereby to provide a lower thermal signature for attack craft 5. In another preferred form of the invention, engine exhaust duct 260 is not routed inside air intake duct 255—rather, in this form of the invention, engine exhaust duct 260 is separate from air intake duct 255, and the exhaust in engine exhaust duct 260 is separately cooled, e.g., with a water cooling jacket. Furthermore, in this form of the invention, insulation may be used to keep the cool air in air intake duct 255 from being heated by the hot exhaust in engine exhaust duct 260 in order to increase the efficiency of gas turbine engines 210.

Preferably, engine exhaust duct 260 includes insulation to prevent the heat of gas turbine engine 210 from overheating the outer skin of strut 300.

In one form of the present invention, engine exhaust ducts 260 are double-walled, so as to allow a fluid to be circulated around the inner hot duct, whereby to further cool the engine exhaust and provide a lower thermal signature.

Attack Craft Propulsion Using Battery Power

Preferably, attack craft 5 also includes an electric motor (not shown) and batteries (not shown) for selectively driving propeller system 215. More particularly, in certain circumstances (e.g., reconnaissance operations and the delivery and/or extraction of special forces) it may be desirable to operate with reduced noise. In these circumstances, the electric motor and batteries may be used in place of the gas turbine (jet) engine discussed above.

Propeller System 215

Most vessels in use today utilize propellers which are disposed at the stern of the vessel and push the vessel through the water. This approach is generally satisfactory for most vessels. However, stern-mounted, pushing propellers are generally not satisfactory for those vessels which are trying to achieve very high speeds, e.g., speeds in excess of 80 knots. This is because propellers located at the stern of the vessel engage water which has been agitated by the prior passage of the vessel through the water. Since the efficiency of propellers is highly affected by the state of the water the propellers move through, stern-mounted, pushing propellers are generally impractical for high speed craft.

Some high speed boats in use today (e.g., hydroplanes and ocean racing boats) use stern-mounted, surface-penetrating, forward-facing propellers that ride partially submerged in agitated water with air mixed in. These piercing propellers are designed with a heavy trailing edge and anti-cavitation cupping. These piercing propellers withstand the extreme forces of high horsepower and high rpm because the propeller is never fully engaged in the water.

However, this type of propeller would not be effective for attack craft 5, since with BTF 200, propeller system 215 must be fully submerged.

Significantly, the present invention utilizes a propeller system 215 which comprises a pair of forward-facing, pulling, counter-rotating propellers 265, 270 located at the bow end of each BTF 200.

More particularly, a propeller system 215 is placed at the bow of each BTF 200 so that the forward-facing, pulling propellers can "bite" into virgin water, whereby to obtain maximum efficiency. Furthermore, each propeller system 215 comprises two propellers, a leading propeller 265 and a trailing propeller 270, operated in a timed, counter-rotating mode, so as to provide reduced cavitation for the forward propeller. Leading propeller 265 is the main propulsion element and does the majority of the work of pulling of the vessel. Trailing propeller 270 spins in the opposite direction from the leading propeller and evacuates water from behind the leading propeller, thereby permitting the leading propeller to work with maximum efficiency. In other words, trailing propeller 270 moves water out from behind leading propeller 265 so that the leading propeller can pull more water in. This provides increased propeller efficiency, which translates into higher speed and lower fuel consumption.

Using serially-mounted, counter-rotating propellers 265, 270 also permits smaller propeller diameters to be used. This is because the surface areas of the two propellers combine so as to provide an overall effective surface area which is equivalent to the surface area of a single, larger diameter propeller. However, it is difficult to rotate a large diameter propeller at high speeds due to the forces involved. Thus, the use of serially-mounted, counter-rotating propellers permits the propellers to be rotated at higher rpms, thereby permitting higher speeds to be achieved.

In addition to the foregoing, by using two counter-rotating propellers, there is no side torque. More particularly, side torque in propellers is the result of the centrifugal forces created by the rotation of the propeller. This side torque creates a tendency for the vessel to turn in the direction of the rotation of the blade. Side torque is not desired with attack craft 5, since it involves a loss of energy and can create steering issues for the vessel.

A gearbox 250 connects a gas turbine engine 210 to a propeller system 215. More particularly, gearbox 250 is configured to convert the single rotational motion of the output shaft of a gas turbine engine 250 into the dual, co-axial, counter-rotational motions needed to drive the counter-rotating propellers, 265, 270.

Super-Cavitation

By placing the counter-rotating propellers 265, 270 on the forward end of BTFs 200, the propellers are able to pull the vessel through clean, undisturbed, virgin water, thereby ensuring optimal propeller performance. In addition, by placing the two serially-mounted, counter-rotating propellers on the fount end of BTFs 200, attack craft 5 is able to generate a highly gaseous environment, comprising a jet stream of dense collapsing bubbles, that encapsulates BTFs 200 and significantly reduce vessel drag. More particularly, the actions of propellers 265, 270, working together, pull water through the leading propeller 265 and allowing the trailing propeller 270 to heavily cavitate the rapidly moving water and create a heavy stream of gaseous bubbles which surround the outer surfaces of BTFs 200. This gaseous envelope reduces hull drag and greatly increases the speed of the vessel, since the BTFs are essentially "flying through bubbles". See FIG. 15A. In this respect it should be appreciated that the kinetic coefficient of friction with air is approximately 1/800th the kinetic coefficient of friction of water. Furthermore, the faster the vessel goes, the greater the reduction in hull friction, inasmuch as (i) the greater the quantity of gaseous bubbles which are created by the serially-mounted, counter-rotating propellers, and (ii) the bubbles do not have time to collapse before BTFs 200 have passed completely through them.

Attack craft 5 can also include additional means for producing an encompassing gaseous envelope. More particularly, a plurality of small holes 275 (FIG. 15B) are preferably located just behind trailing propeller 270 and disposed in a circler fashion about the periphery of the BTF structure. These holes 275 are in communication with ductwork leading to the outside air, allowing the trailing propeller to create a siphon effect, drawing air down for release just aft of the trailing propeller, whereby to create an even more dense gaseous envelope for reducing BTF friction. Alternatively, a pressurized gas source connected to small holes 275 can also be used to release gas just aft of the trailing propeller, whereby to create the desired gaseous envelope for reducing BTF friction. In yet another form of the invention, a supply of friction-reducing fluid (e.g., detergent) can be connected to the aforementioned small holes 275, whereby to create the desired friction-reducing envelope about BTFs 200.

Rudderless System

Conventional rudders are continuously deployed in the water, so that they create friction and drag not only when being manipulated so as to change the direction of the vessel, but also under normal operating conditions. This friction and drag has a substantial detrimental effect on the speed of the vessel.

In contrast, and looking now at FIGS. 16-26, attack craft 5 provides forward and aft steering elements (or spoilers) 225 that are projectable from, and retractable into, the outer skin of hollow tubular structure 205. In this respect it should be appreciated that each of the spoilers 225 can be projected an adjustable amount outboard from hollow tubular structure 205. Furthermore, command module 100 can be provided with various control systems which permit each of the spoilers 225 to be operated in a coordinated fashion or, if desired, independently from one another. In one preferred form of the invention, sixteen spoilers 225 are provided: four spoilers 225 at the front of each BTF 200 and four spoilers 225 at the rear of each BTF 200, with spoilers 225 being disposed at the "12 o'clock", "3 o'clock", "6 o'clock", and "9 o'clock" positions. This arrangement allows spoilers 225 to apply left, right, up and/or down forces (or any combination thereof) to the front and/or rear of each of the BTFs 200 while attack craft 5 is underway.

Spoilers 225 provide numerous significant advantages over conventional rudders.

For one thing, spoilers 225 provide substantially no drag when the vessel is underway and no directional changes are needed—this is because the spoilers then reside flush with the outer skins of hollow tubular structures 205. Spoilers 225 impose drag on the vessel only when they are extended outwardly from the skins of hollow tubular structures 205, whereby to provide the forces necessary to maneuver the vessel—and they are thereafter returned to their inboard (i.e., flush, and no-drag) positions as soon as the maneuver is completed and the vessel returns to standard forward motion.

Additionally, and significantly, the provision of spoilers 225 on the fore and aft portions of hollow tubular structures 205 permits the application of more dramatic turning forces. More particularly, by setting a fore spoiler to turn in one direction and a corresponding aft spoiler to turn in the opposite direction, significant turning forces can be quickly and easily applied to the vessel using spoilers of relatively modest size. Thus, course corrections can be effected quickly, making the vessel extremely agile, while permitting the turning friction of the spoilers to be applied only for short durations.

Figure 24:
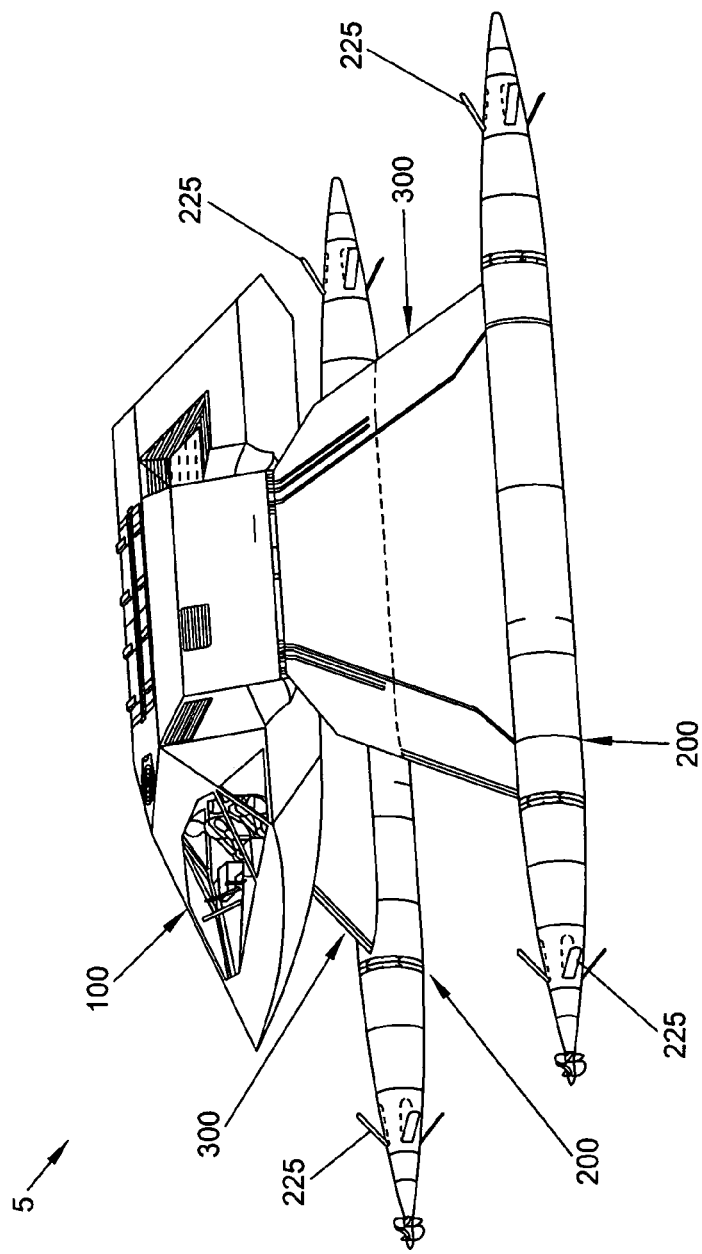
Figure 25:
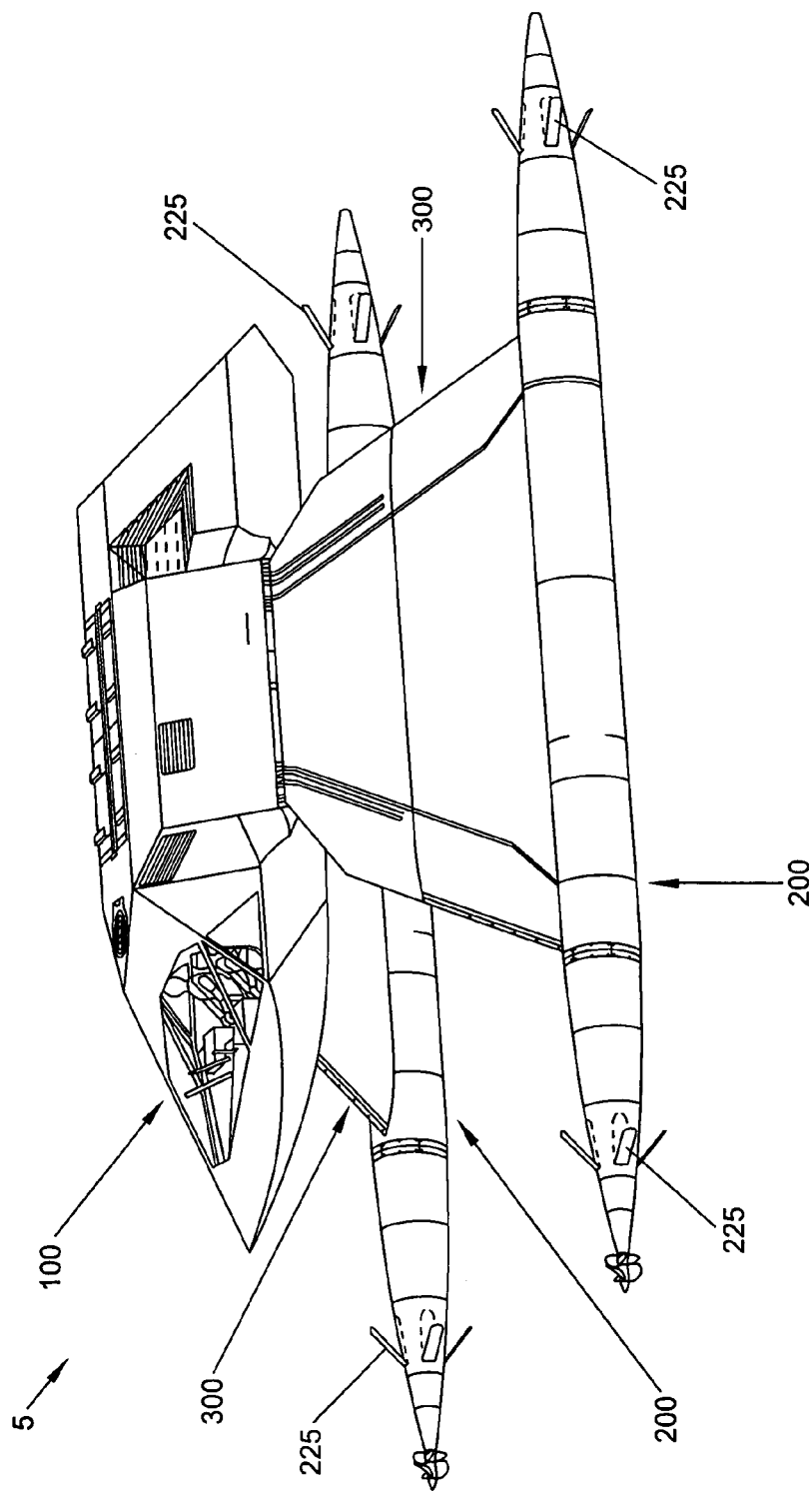
Figure 26:
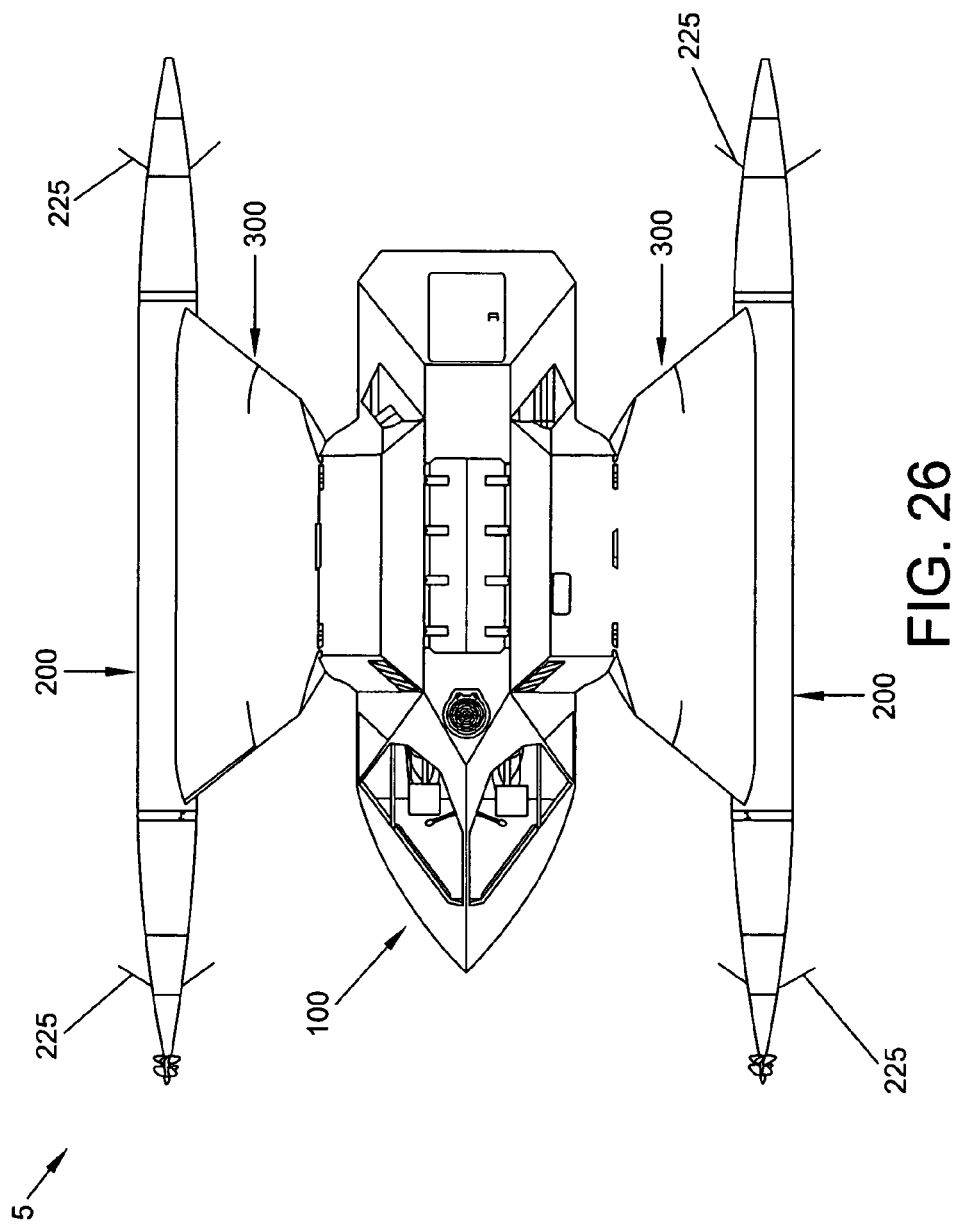

Spoilers 225 can be used for turning left or right (see FIGS. 16-19), for adjusting the trim (i.e., the up/down attitude) of the vessel (see FIGS. 20-23), and/or to enhance deceleration of the vessel (see FIGS. 24-26).

Spoilers 225 can be flush plates that protrude from the outer skins of hollow tubular structures 205 and cause friction when needed to change direction. Alternatively, spoilers 225 can be made of an elastomeric material that can be inflated with air, fluids, etc. and which protrude from the outer skins of hollow tubular structures 205.

Fuel Tanks 220

Fuel tanks 220 are housed inside BTFs 200, preferably in the center section 230. Fuel tanks 220 preferably comprise double-walled tanks made of a flexible bladder material (e.g., a flexible bladder disposed inside another flexible bladder). This arrangement allows for a fluid (e.g., seawater) to be pumped into the outer bladder in order to compensate for the consumption of fuel from within the inside bladder, thereby ensuring that the buoyancy of the attack craft remains constant.

Center of Gravity

The center of gravity for attack craft 5 is intended to be as low as possible, in order to maximize vessel stability. This is achieved by positioning heavy components such as engines 210 and fuel tanks 220 within the BTFs, thereby lowering the vessel's center of gravity so as to be as close as possible to the midline of the BTFs. In this respect it will be appreciated that turbine engines 210 and fuel tanks 220 constitute approximately ⅔ of the total vessel weight and, due to the construction of attack craft 5, this weight is disposed entirely below the waterline. This leads to enhanced vessel stability.

Connecting Struts 300

Figure 27:
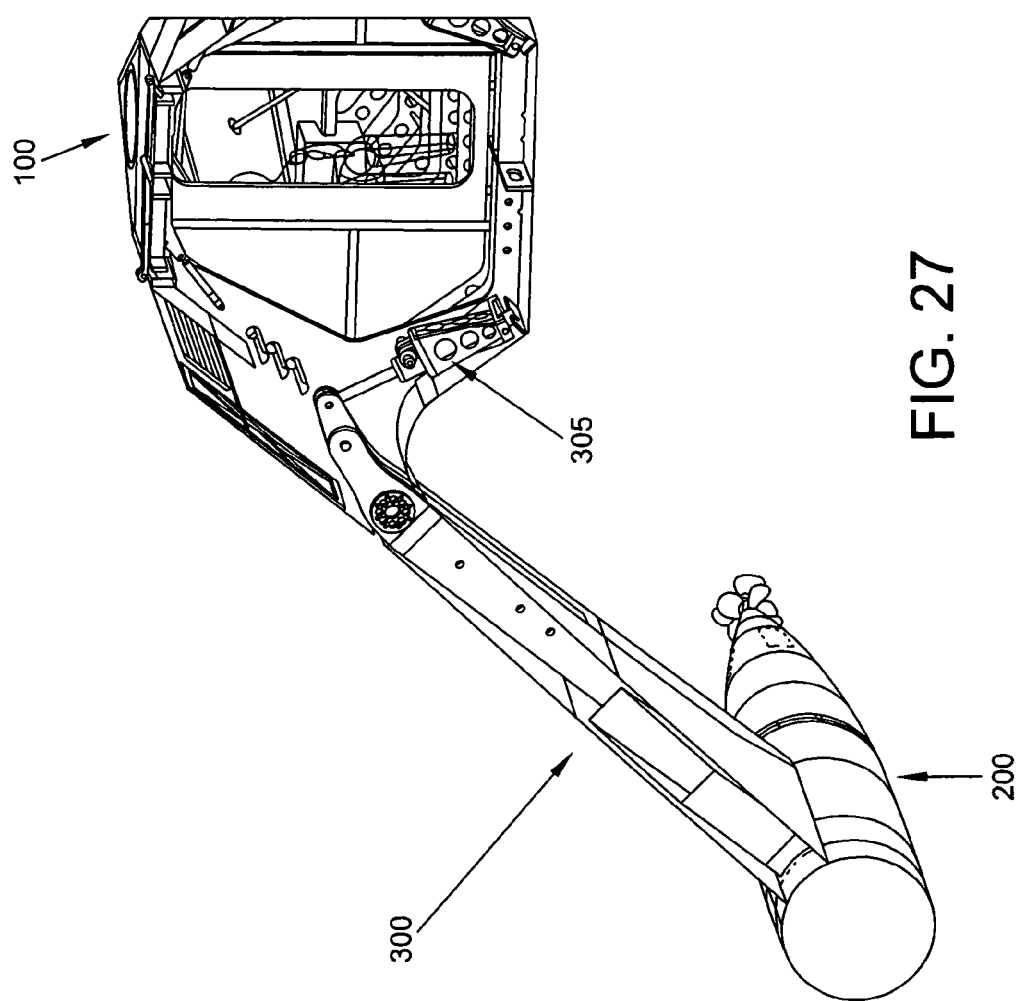
FIGS. 27-36 are schematic views showing how the position of the struts and BTFs can be adjusted relative to the command module.
Figure 28:
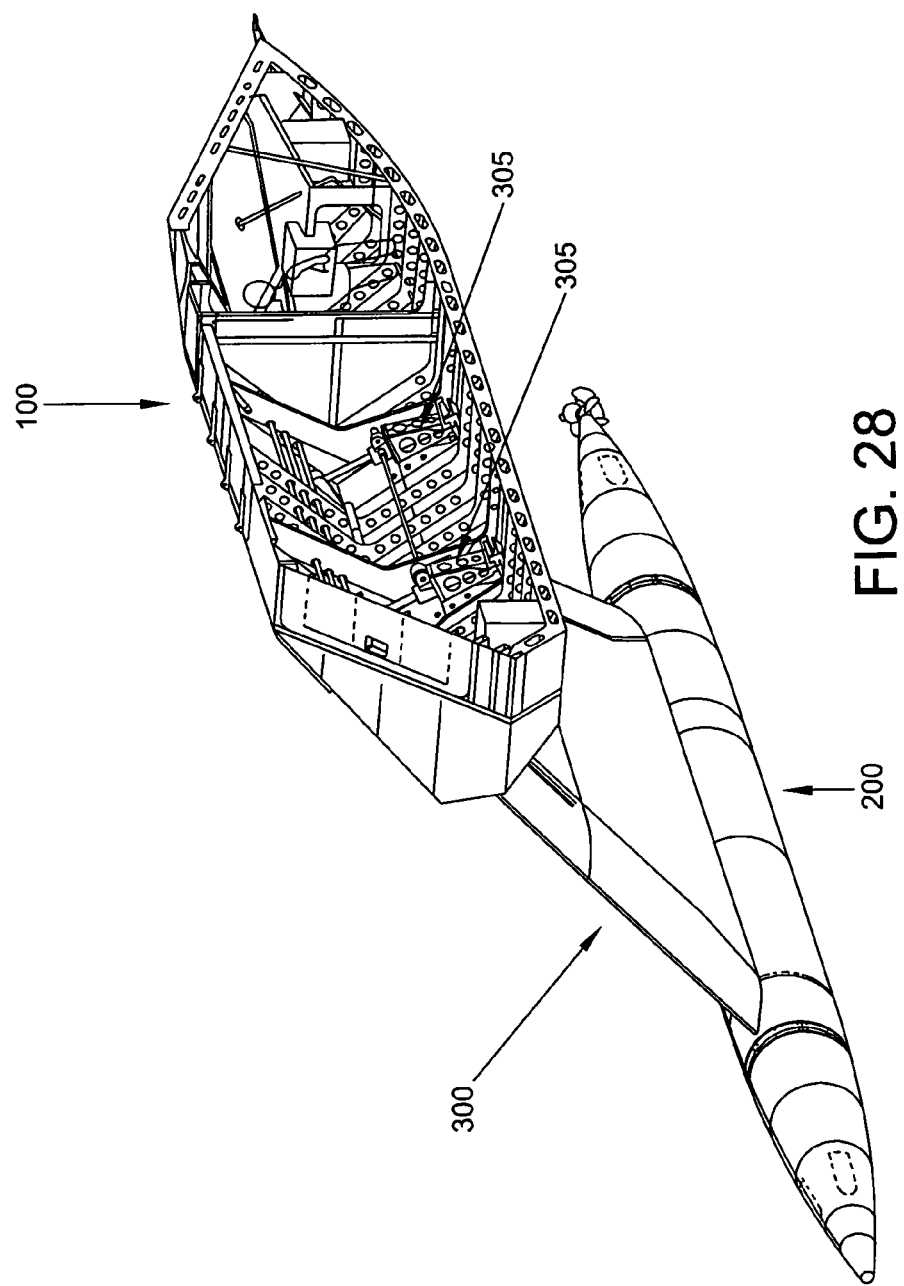
Figure 29:
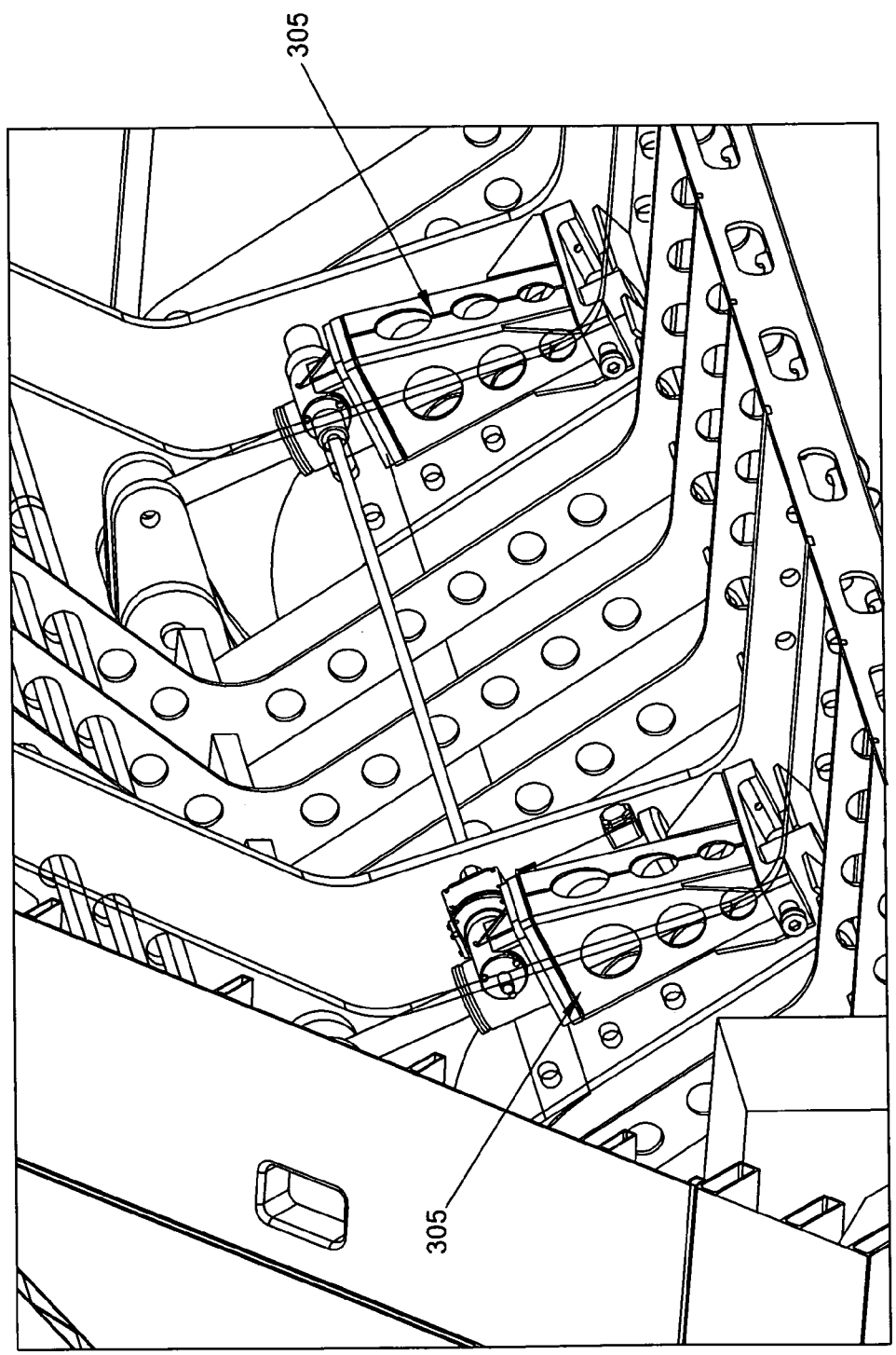
Figure 30:
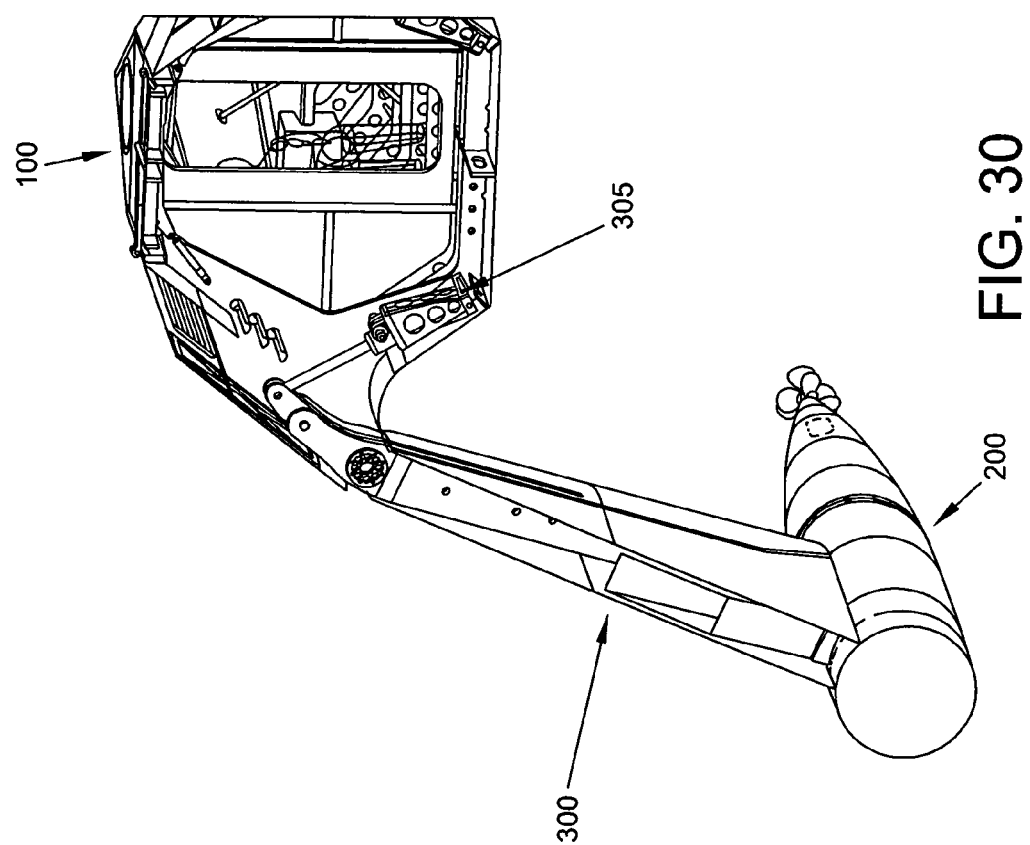
Figure 31:
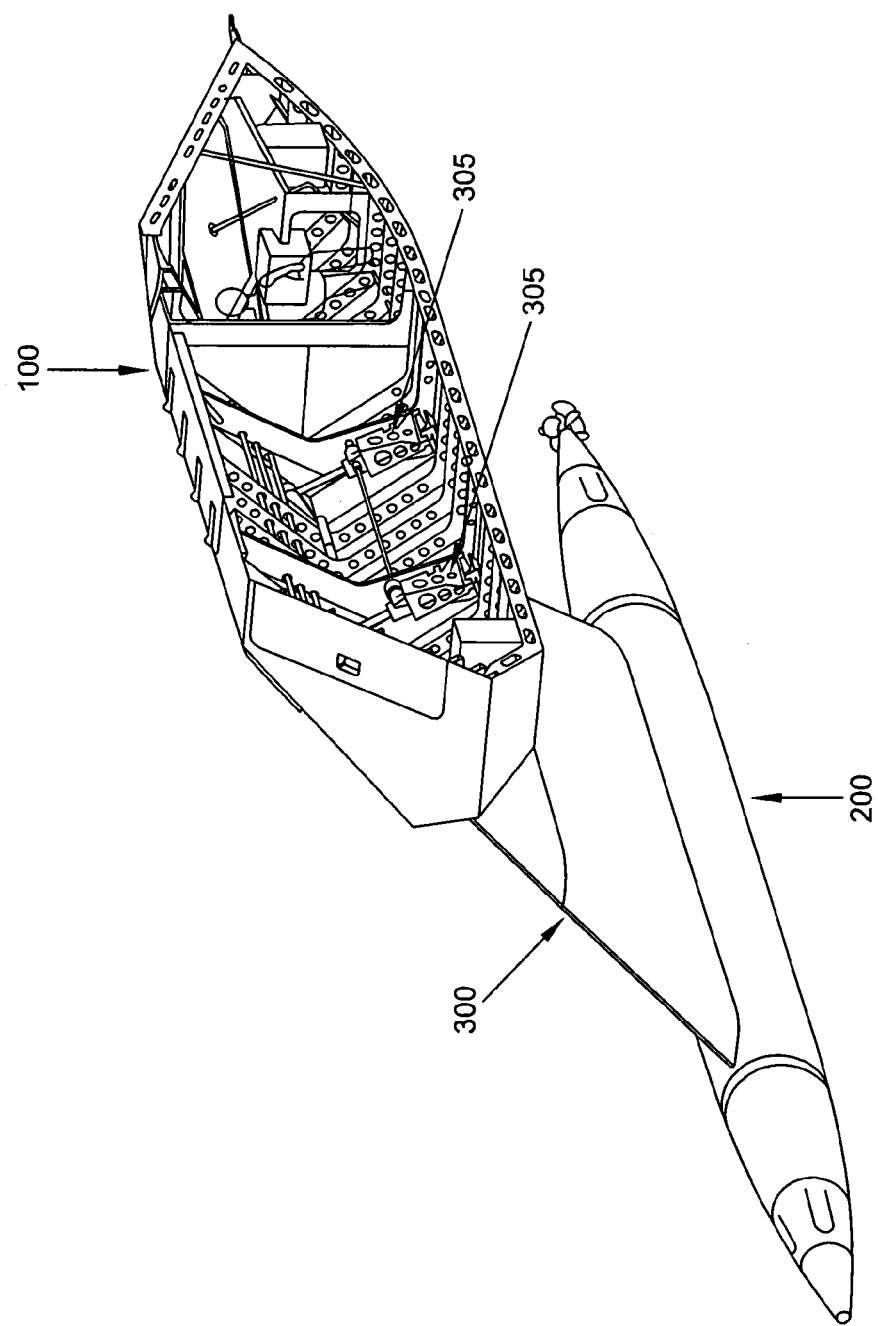
Figure 32:
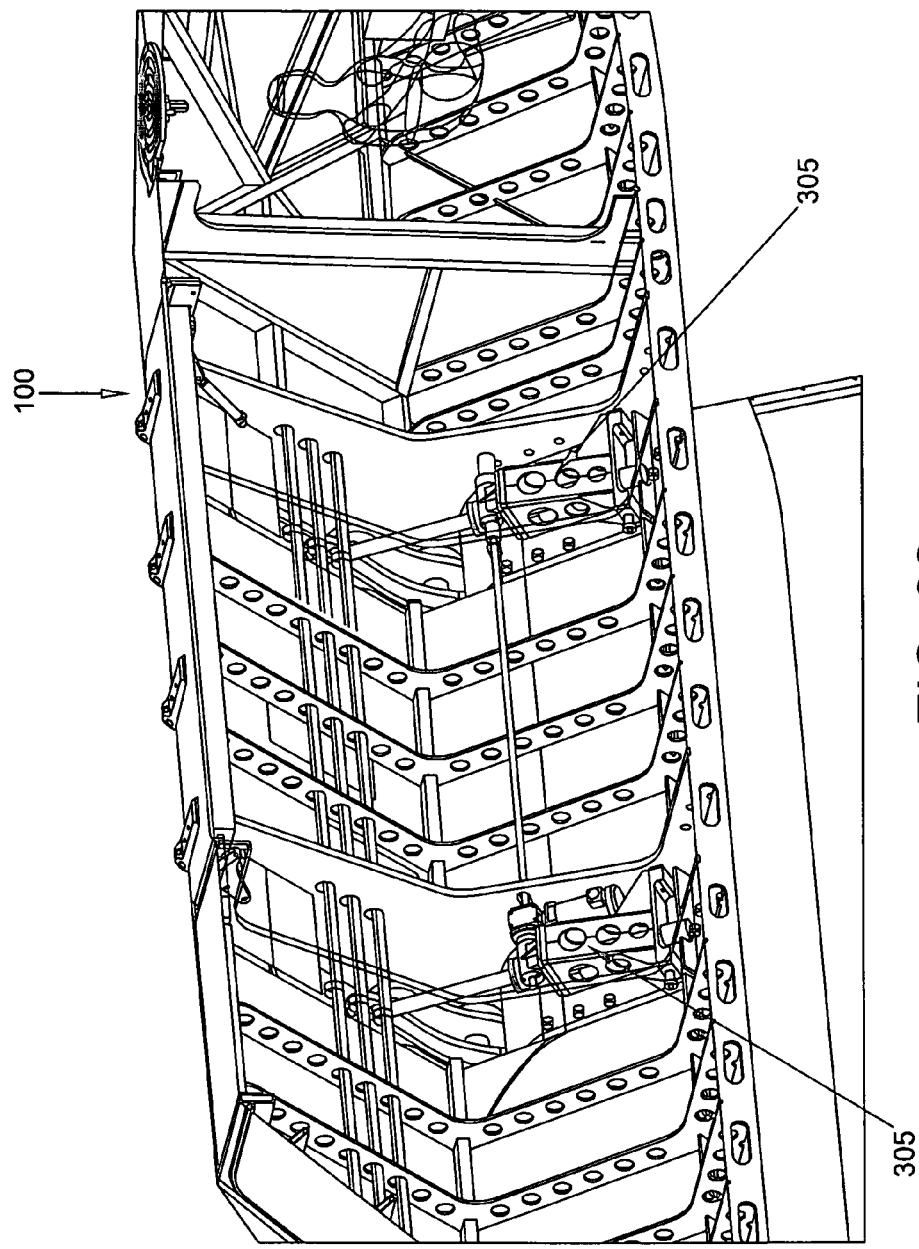
Figure 33:
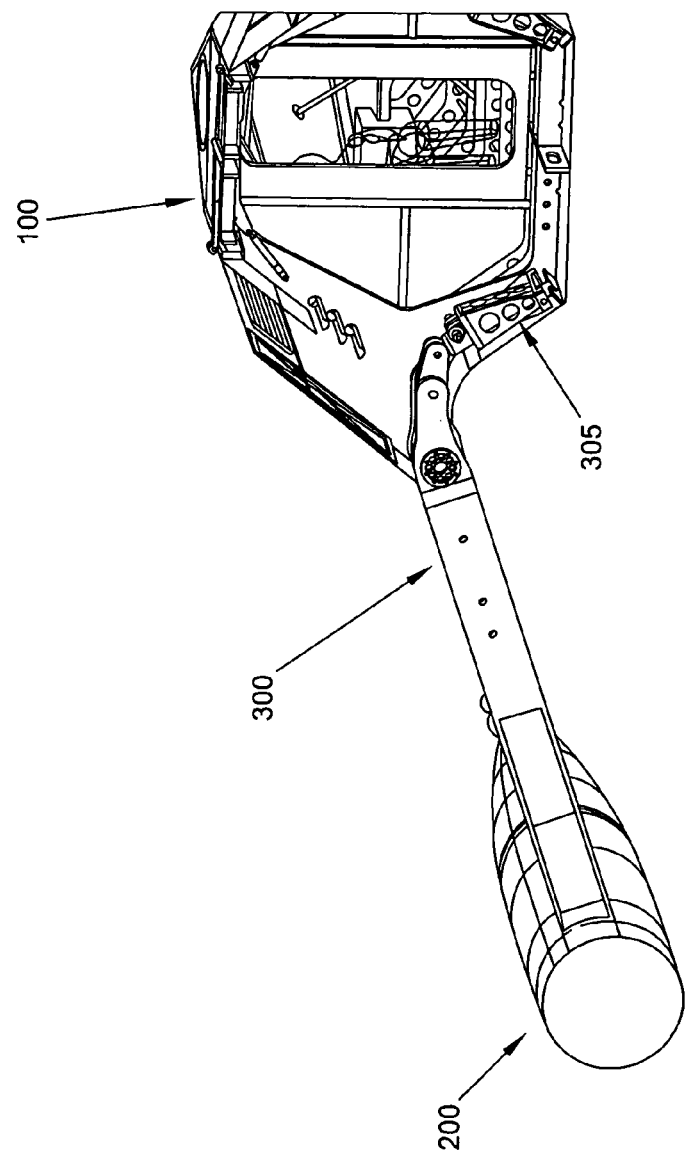
Figure 34:
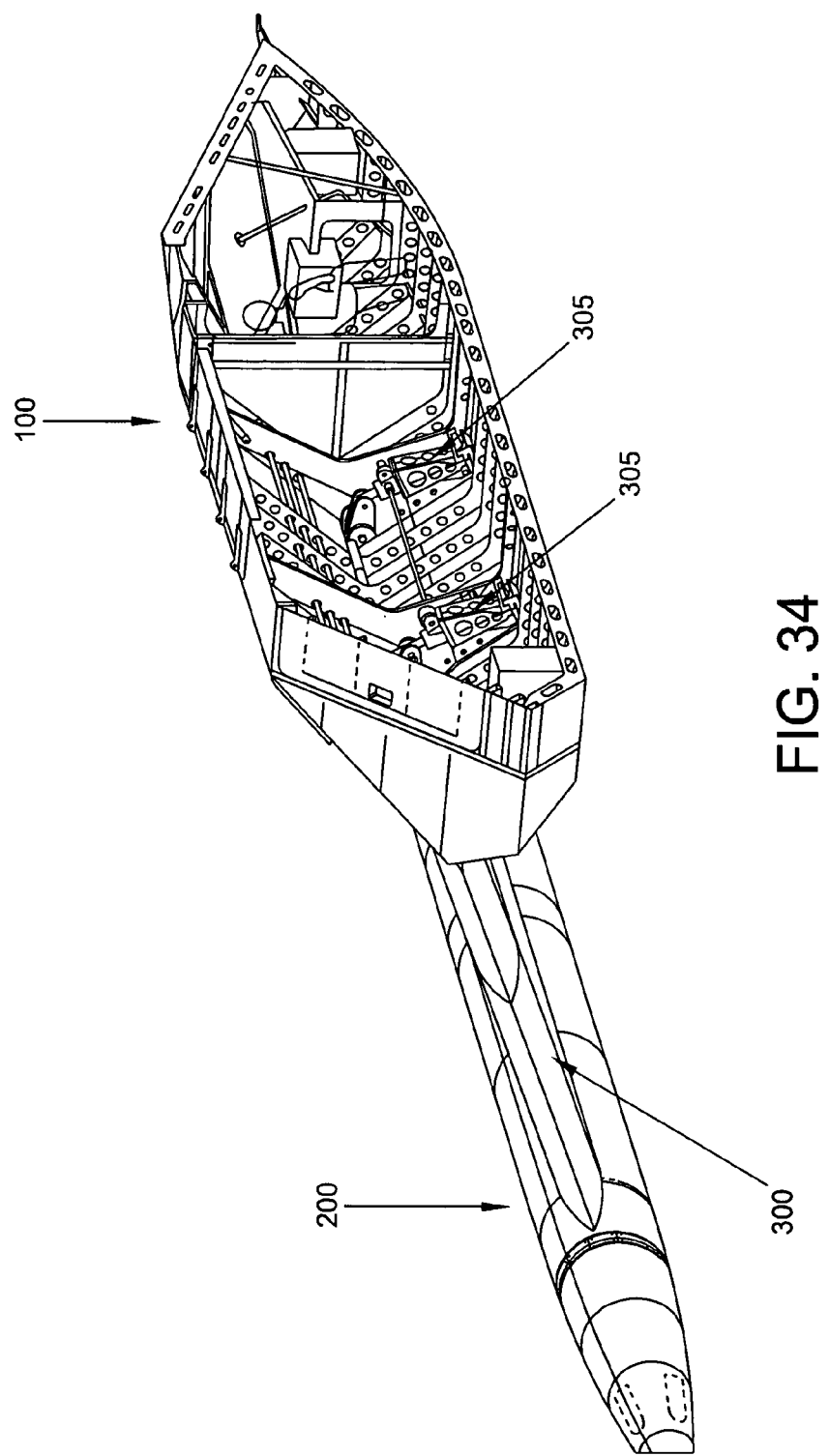
Figure 35:
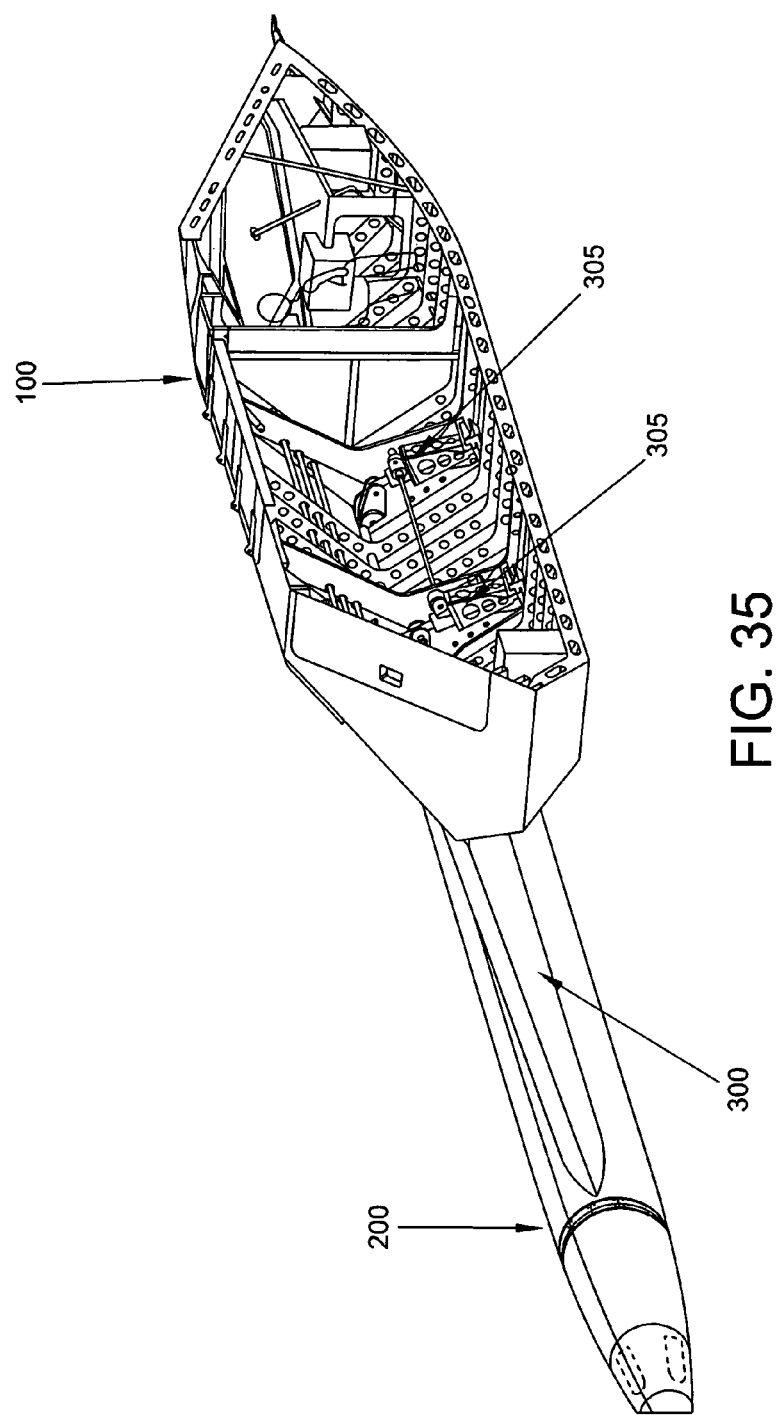
Figure 36:
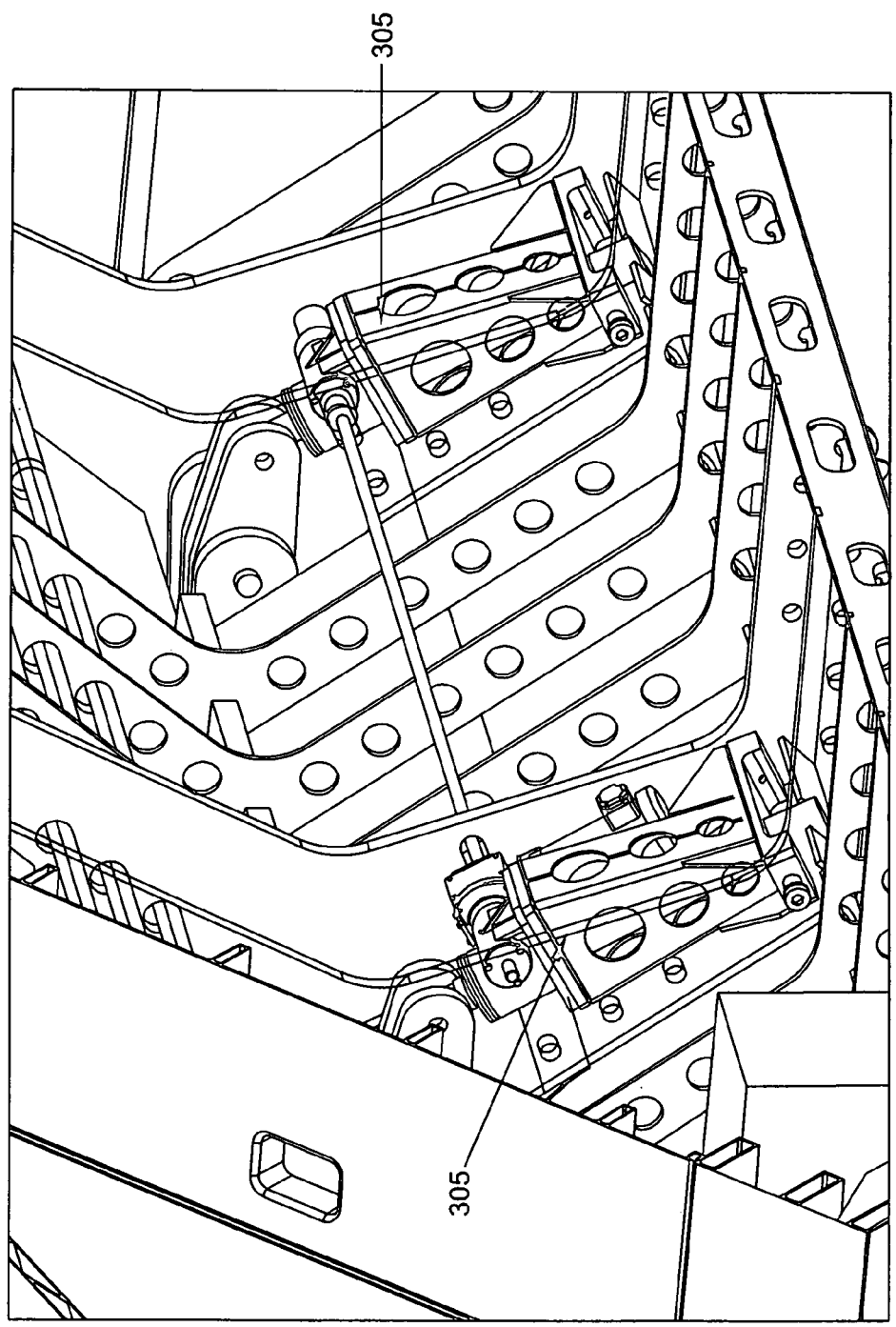

As noted above, connecting struts 300 attach BTFs 200 to command module 100. As also noted above, struts 300 are designed to be fixed to BTFs 200 and pivot on command module 100 so as to allow attack craft 5 to assume different configurations (FIGS. 4, 7 and 8), whereby to permit command module 100 to sit different distances from the water. As seen in FIGS. 27-36, struts 300 comprise hydraulic or electric jack screws 305 connected to load arms located within struts 300, whereby to move struts 300 relative to command module 100. In this respect it will be appreciated that FIGS. 27-29 show struts 300 in a position corresponding to the attack craft configuration shown in FIG. 4, FIGS. 30-32 show struts 300 in a position corresponding to the attack craft configuration shown in FIG. 7, and FIGS. 33-36 show struts 300 in a position corresponding to the attack craft configuration shown in FIG. 8.

Since struts 300 extend into the water, it is important to keep the struts as thin as possible so as to minimize drag.

It should also be appreciated that the structural integrity of struts 300 relies primarily on the strength of the load arms located within the struts acting in conjunction with the outer skin of the struts, while using minimal internal frames. This is important, since struts 300 need to have large areas of uninterrupted volume in order to permit engine intake to pass uninterrupted through the interior of the struts.

Fly-By-Wire Controls

In one preferred form of the invention, sensors are located on hull-like bottom surface 110 of command module 100 and continuously measure the distance of the command module from the water surface. A computer automatically adjusts the disposition of struts 300 so as to maintain the command module a desired distance above the water surface. In this respect it will be appreciated that, particularly when attack craft 5 is operating at high speeds (e.g., 80 knots) in open water, it is important to keep command module 100 from coming into contact with the surface of the water (and particularly important to keep command module 100 from coming into contact with the irregular sea swells commonly found in the open sea).

Thus, for example, in standard seas, attack craft 5 might be placed in the configuration shown in FIG. 4 so that command module 100 is safely out of the water and the vessel has modest radar, infrared and visual signatures.

However, in high seas, while operating at high speed, attack craft 5 might be placed in the configuration shown in FIG. 7 so that command module 100 stands well out of the water and is free from the affect of swells.

Furthermore, depending on sea conditions, attack craft 5 could be in a configuration somewhere between those shown in FIGS. 4 and 7.

Attack craft 5 is also designed to operate in stealth mode, by lowering its physical profile. In this case, attack craft 5 might be placed in the configuration shown in FIG. 8 so that command module 100 sits just above, or actually in, the water, reducing its radar, infrared and visual signatures. This mode can be very useful when attack craft 5 is being used for reconnaissance purposes and/or to deliver small teams of special forces behind enemy lines and/or to extract the same.

Thus, in one preferred form of the invention, attack craft 5 is normally operated in the configuration shown in FIG. 4, with command module 100 completely out of the water; but the command module being as low as possible so as to have a reduced profile. However, in high seas and at high speed, attack craft 5 may be operated on the configuration shown in FIG. 7, so that command module 100 stands well clear of any swells. And, when desired, attack craft 5 can be operated in the configuration shown in FIG. 8 so as to assume a stealth mode.

Or, attack craft 5 could be operated in a configuration somewhere between those shown in FIGS. 4, 7 and 8.

Preferably, speed sensors feed speed data to a main computer, which adjusts the sensitivity of the steering controls so that, while travelling at low speeds, the controls are more reactive and when travelling at high speeds, the controls are less reactive. In other words, the main computer preferably adjusts the sensitivity of the steering controls so that (i) large movements of the steering controls (e.g., a joystick) are required at high speeds to make modest changes in the disposition of spoilers 225, and (ii) small movements of the steering controls are required at slow speeds to make significant changes in the disposition of spoilers 225. This construction eliminates the possibility that a modest movement of the controls at high speed will result in a catastrophic change in the direction or attitude of the craft.

Extendable BTF Boom

If desired, BTFs 200 can be provided with an extendible boom. This boom is deployable from the rear end of the BTF, and is preferably flexible. The extendible boom can serve two purposes.

First, the extendible boom can have controllable surface protrusions along its length that can be enlarged or contracted so as to allow drag to be applied to the boom, thus further stabilizing the BTF in a manner similar to the tail of a kite. The protrusions cause drag that stabilizes the vessel in both the horizontal and vertical planes. The protrusions can be controlled by elastic bladders which are inflated so as to increase size (and hence drag) as desired, or a mechanical device located at the end of the boom that provides mechanical drag resistance, thereby increasing stability.

Second, the extendible boom can also house sonar, listening devices, magnetometers, gravity interruption sensors, etc. that can be used for the identification of submerged objects. By mounting these devices on the end of an extendible boom, the devices can be isolated' from the remainder of attack craft 5, so as to minimize interference with device function.

Non-Military and Civilian Applications

In the foregoing description, attack craft 5 is described in the context of its use for military applications. However, it should be appreciated that attack craft 5 may also be used for other, non-military applications such as security applications (e.g., police, immigration and drug enforcement purposes), public safety applications (e.g., sea rescues), high-speed servicing and re-supply applications (e.g., for servicing oil drilling platforms), high-speed water taxi applications, private pleasure craft applications, etc.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A marine vessel comprising:
   a command module;
   first and second buoyant tubular foils; and
   first and second struts for connecting the first and second buoyant tubular foils to the command module, respectively;
   wherein the first and second buoyant tubular foils provide substantially all of the buoyancy required for the marine vessel; and
   wherein the marine vessel further comprises a plurality of spoilers mounted on the first and second buoyant tubular foils for steering the marine vessel as it moves through the water;
   wherein some of the spoilers are disposed on the leading ends of the first and second buoyant tubular foils and some of the spoilers are disposed on the trailing ends of the first and second tubular foils; and
   wherein the marine vessel further comprises a control system for coordinating the disposition of the spoilers, such that when a spoiler disposed on the leading end of a buoyant tubular foil is activated, a diametrically-opposed spoiler disposed on the trailing end of that same buoyant tubular foil is also activated.

2. A marine vessel according to claim 1 wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted.

3. A marine vessel according to claim 2 wherein each of the spoilers is pivotally attached to its associated buoyant tubular foil at the leading end of the spoiler.

4. A marine vessel according to claim 1 wherein at least some of the plurality of spoilers are disposed on the first and second buoyant tubular foils so as to control side-to-side steering of the marine vessel.

5. A marine vessel according to claim 1 wherein at least some of the plurality of spoilers are disposed on the first and second buoyant tubular foils so as to control up-and-down attitude of the marine vessel.

6. A marine vessel according to claim 1 wherein some of the plurality of spoilers are disposed on the first and second buoyant tubular foils so as to control side-to-side steering of the marine vessel and some of the plurality of spoilers are disposed on the first and second buoyant tubular foils so as to control the up-and-down attitude of the marine vessel.

7. A marine vessel comprising:
   a buoyant tubular foil; and
   a plurality of spoilers mounted on the buoyant tubular foil for steering the marine vessel as it moves through the water;
   wherein some of the spoilers are disposed on the leading end of the buoyant tubular foil and some of the spoilers are disposed on the trailing end of the buoyant tubular foil; and
   wherein the marine vessel further comprises a control system for coordinating the disposition of the spoilers, such that when a spoiler disposed on the leading end of the buoyant tubular foil is activated, a diametrically-opposed spoiler disposed on the trailing end of the buoyant tubular foil is also activated.

8. A marine vessel according to claim 7 wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted.

9. A marine vessel according to claim 7 wherein each of the spoilers is pivotally attached to its associated buoyant tubular foil at the leading end of the spoiler.

10. A marine vessel according to claim 7 wherein at least some of the plurality of spoilers are disposed on the buoyant tubular foil so as to control the side-to-side steering of the marine vessel.

11. A marine vessel according to claim 7 wherein at least some of the plurality of spoilers are disposed on the buoyant tubular foil so as to control the up-and-down attitude of the marine vessel.

12. A marine vessel according to claim 7 wherein some of the plurality of spoilers are disposed on the buoyant tubular foil so as to control the side-to-side steering of the marine vessel and some of the plurality of spoilers are disposed on the buoyant tubular foil so as to control the up-and-down attitude of the marine vessel.

13. A method for moving through water, the method comprising:
   providing a marine vessel comprising:
   a command module;
   first and second buoyant tubular foils; and
   first and second struts for connecting the first and second buoyant tubular foils to the command module, respectively;
   wherein the first and second buoyant tubular foils provide substantially all of the buoyancy required for the marine vessel; and
   wherein the marine vessel further comprises a plurality of spoilers mounted on the first and second buoyant tubular foils for steering the marine vessel as it moves through the water;
   wherein some of the spoilers are disposed on the leading ends of the first and second buoyant tubular foils and some of the spoilers are disposed on the trailing ends of the first and second tubular foils; and wherein the marine vessel further comprises a control system for coordinating the disposition of the spoilers, such that when a spoiler disposed on the leading end of a buoyant tubular foil is activated, a diametrically-opposed spoiler disposed on the trailing end of that same buoyant tubular foil is also activated; and moving the marine vessel through water and adjusting the position of the spoilers.

14. A method for moving through water, the method comprising:

providing amarine vessel comprising:

a buoyant tubular foil; and a plurality of spoilers mounted on the buoyant tubular foil for steering the marine vessel as it moves through the water;

wherein some of the spoilers are disposed on the leading end of the buoyant tubular foil and some of the spoilers are disposed on the trailing end of the buoyant tubular foil; and wherein the marine vessel further comprises a control system for coordinating the disposition of the spoilers, such that when a spoiler disposed on the leading end of the buoyant tubular foil is activated, a diametrically-opposed spoiler disposed on the trailing end of the buoyant tubular foil is also activated; and moving the marine vessel through water and adjusting the position of the spoilers.

* * * * *